United States Patent Office 3,754,083
Patented Aug. 21, 1973

3,754,083
ANTIBIOTICS T-7545 AND PROCESS OF
PRODUCING SAME
Motto Shibata, Toyonaka, Takashi Iwasa, Kyoto, Hiroichi Yamamoto, Kobe, Mitsuko Asai, Takatsuki, and Komei Mizuno, Settsu, Japan, assignors to Takeda Chemical Industries, Ltd., Osaka, Japan
Filed Oct. 28, 1969, Ser. No. 871,899
Claims priority, application Japan, Oct. 29, 1968, 43/78,720; Sept. 20, 1969, 44/74,855
Int. Cl. A61k 21/00
U.S. Cl. 424—118                4 Claims

ABSTRACT OF THE DISCLOSURE

A new antibiotic T-7545 (Validamycin) is produced by culturing strains of microorganisms belonging to the genus streptomyces. Compositions containing the antibiotics are useful for controlling diseases in plants.

---

Figure 1:
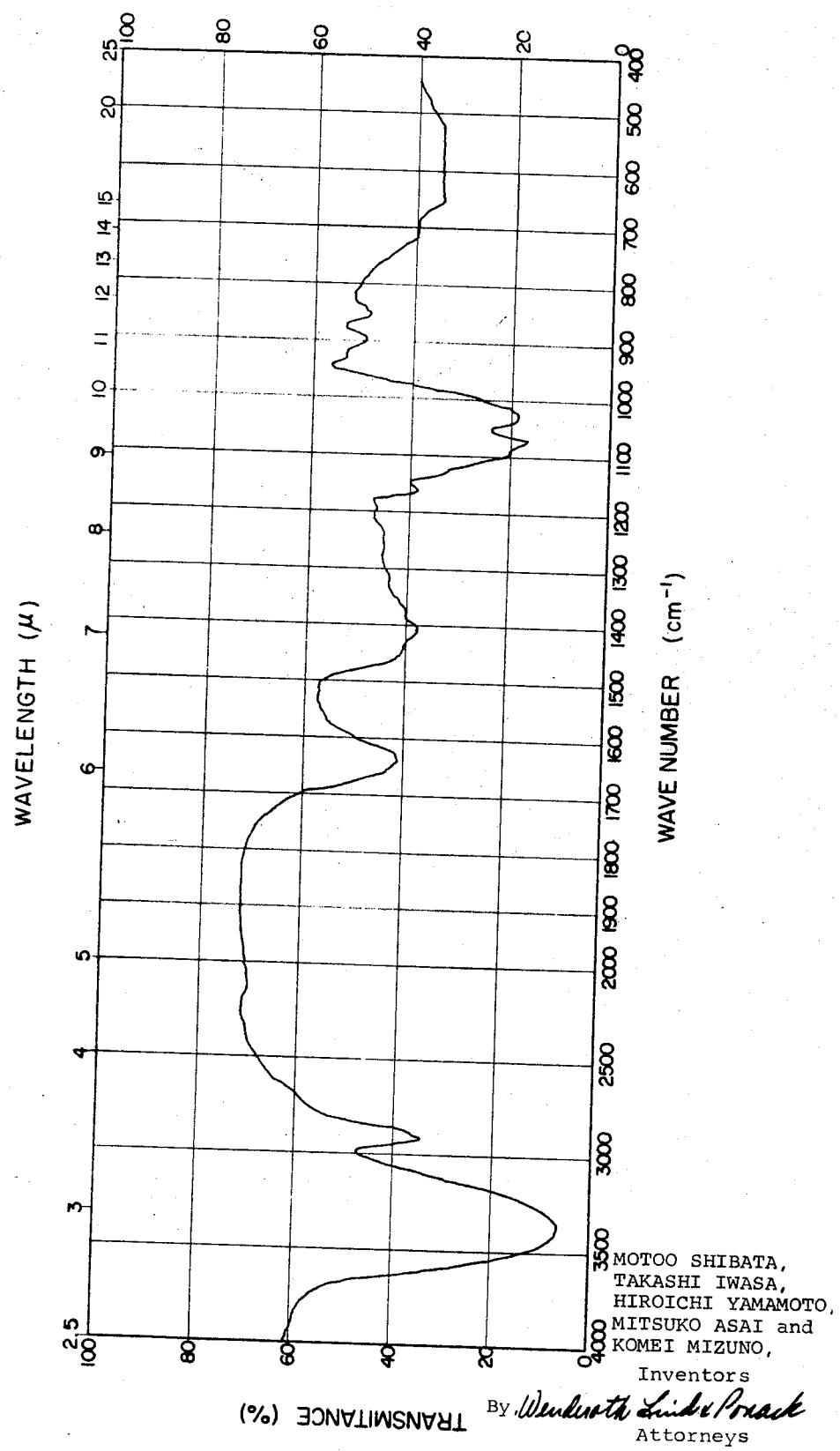

The present invention relates to new antibiotics. More particularly the invention provides new antibiotics T-7545 (Validamycin) which is made up of antibiotic T-7545-A, antibiotic T-7545-B esters thereof, salts thereof or the and is obtained by cultivating the antibiotic T-7545-producing strain belonging to the Actinomycetes.

In search of new antibiotic substances, the present inventors isolated a large number of soil microorganisms and studied their metabolites. The research work led to the finding that certain soil microorganisms are capable of producing a new antibiotic designated as T-7545, that those microorganisms belong to the Actinomycetes and that it is possible to obtain said antibiotic by cultivating those microorganisms so that the said antibiotic may be accumulated in the culture medium. In the instant specification, the term "Antibiotic T-7545" ester thereof, salts thereof refers to the Antibiotcs T-7545-A, T-7545-B or mixtures thereof.

Thus, the invention relates to a new antibiotic, which is produced by cultivating a T-7545-producing strain belonging to the Actinomycetes (hereinafter referred to sometimes as the T-7545-producing strain) so that the said antibiotic is produced and accumulates in the fermented broth and recovering the antbiotic so accumulated from said fermented broth.

Furthermore, it is found unexpectedly that these new antibiotics T-7545 show an excellent controlling effect against plant diseases, for example, the sheath blight of rice plant by the application in vivo, although they show no antimicrobial potency in vitro against bacteria and fungi.

It is the principal object of this invention to provide new antibiotic T-7545 and the method of preparing the same.

Another object is to provide a fungicide for combatting bacterial or fungal plant diseases showing no substantial phytotoxicity.

Another object is to provide a fungicide which is substantially non-toxic against both human beings and animals as well as fish.

Further object is to provide a concentrate form of said fungicide, which is applicable, simply diluted at the use, to the host for the same purpose as mentioned just above, and which is more stable and more convenient in storage or transport than the diluted composition for the ready use to the plant.

Further object is to provide a systemic fungicide which shows a strong infiltrating action to plants.

Other objects will be apparent from the description detailed hereinafter in this specification.

The antibiotics T-7545 is obtained by cultivation of a T-7545 producing strain belonging to the Actinomycetes, so long as it is capable of producing the antibiotic T-7545. For example, the strain which was isolated from the soil by the present inventors collected in Akashi City, Hyogo Prefecture, Japan and named *Streptomyces hygroscopicus* var. *limoneus*, as well as its related strain, may be employed to particular advantage.

Some of the microbiological and cultural characteristics of *Streptomyces hygroscopicus* var. *limoneus* are shown below. In the following descriptions of the cultural characteristics, "Rdg." means the color name according to Ridgeway's "Color Standard and Color Nomenclature."

(1) Morphological characteristics

The aerial mycelium of this strain shows monopodial branching and the conidia chain are formed in spiral. They are ovoid or rectangular, ranging from $1.0$–$1.3\mu$ x $1.0$–$1.5\mu$, and has a smooth surface.

(2) Growth cultural characteristics

The following cultural characteristics, unless otherwise stated, are those observed upon cultivation at 28° C. Where cultivation was carried out at any temperature other than 28° C., that temperature is indicated in parentheses.

(a) Czapek's agar
  Growth: Colorless, folded.
  Reverse: Raw Sienna (Rdg., III, 17–i) to Sudan Brown (Rdg., III, 15–k).
  Aerial mycelium: Tilleul Buff (Rdg., XL, 17'''–f) to Light Buff (Rdg., XV, 17'–f), partially Mouse Gray (Dg., LI, 15''''') along the periphery of the colony.
  Soluble pigment: Yellow with a faint brownish tinge.

(b) Glucose Czapek's agar
  Growth: Colorless to Sulphin Yellow (Rdg., IV, 21–i), folded.
  Reverse: Raw Sienna.
  Aerial mycelium: Tilleul Buff to Massicot Yellow (Rdg., XVI, 21'–f), partially Light Olive Gray (Rdg., LI, 23'''''–d) along the periphery of the colony.
  Soluble pigment: Yellow with a faint brownish tinge.

(c) Glycerin Czapek's agar
  Growth: Colorless to Orange Citrine (Rdg., IV, 19–k), folded.
  Reverse: Raw Sienna.
  Aerial mycelium: Tilleul Buff to Massicot Yellow, partially Light Olive Gray.
  Soluble pigment: Yellow with a faint brownish tinge.

(d) Glucose asparagine agar
  Growth: Colorless.
  Reverse: Old Gold (Rdg., XVI, 19'–i) to Antimony Yellow (Rdg., XV, 17'–b) to Cinnamon Brown (Rdg., XV, 15'–k).
  Aerial mycelium: Light Olive Gray to Mouse Gray, with yellow patches and black moist areas.
  Soluble pigment: Light Brown.

(e) Calcium malate agar
  Growth: Primuline Yellow (Rdg., XVI, 19')
  Reverse: Primuline Yellow.
  Aerial mycelium: Scarce at first, but Tilleul Buff to Light Olive Gray later.
  Soluble pigment: Pale yellow.
(f) Starch agar
  No growth.
(g) Modified starch agar with the following components

| | Percent |
|---|---|
| Soluble starch | 1 |
| Potassium monohydrogen phosphate | 0.3 |
| Calcium carbonate | 0.3 |
| Magnesium sulfate | 0.1 |
| Ammonium sulfate | 0.2 |
| Sodium chloride | 0.05 |
| Agar | 2 |

Growth: Colorless to Barium Yellow (Rdg., XVI, 23'-d).
  Reverse: Deep Colonial Buff (Rdg., XXX, 21"-b) to Snuff Brown (Rdg., XXIX, 15"-k).
  Aerial mycelium: Cartridge Buff (Rdg., XXX, 19"-f) to Mouse Gray, with black moist areas.
  Soluble pigment: Light Brown.
  Hydrolyzation of starch was observed.
(h) Tyrosine agar
  Growth: Colorless to Strontian Yellow (Rdg., XVI, 23').
  Reverse: Pale Ochraceous Buff (Rdg., XV, 15'-f) to Light Ochraceous Buff (Rdg., XV., 15'-d).
  Aerial mycelium: None.
  Soluble pigment: None.
(i) Yeast extract agar
  Growth: Colorless, folded.
  Reverse: Cream color (Rdg., XVI, 19-f).
  Aerial mycelium: White.
  Soluble pigment: Light Brown.
(j) Nutrient agar (37° C.)
  Growth: Colorless.
  Reverse: Colorless.
  Aerial mycelium: None.
  Soluble pigment: None.
(k) Glucose Nutrient agar (37° C.)
  Growth: Colorless, wrinkled.
  Reverse: Cartridge Buff to Pale Ochraceous Buff.
  Aerial mycelium: None.
  Soluble pigment: None.
(l) Nutrient broth (37° C.)
  Growth: Colorless surface growth, and colorless flocculent growth in the bottom.
  Aerial mycelium: None.
  Soluble pigment: None.
(m) Glucose nutrient broth (37° C.)
  Growth: Surface growth, Cartridge Buff, and colorless flocculent growth in the bottom.
  Aerial mycelium: None.
  Soluble pigment: None.
(n) Potato plug
  Growth: Colorless to Pale Ochraceous Buff.
  Aerial mycelium: Tilleul Buff to Mouse Gray.
    The plug turns to Sayal Brown (Rdg., XXIX, 15"-i).
(o) Carrot plug
  Growth: Colorless.
  Aerial mycelium: White to Mouse Gray.
    The plug turns to Cinnamon Rufous (Rdg., XIV, 11'-i) to Cinnamon Brown.
(p) Cellulose
  Growth: Chartreuse Yellow (Rdg., XXXI, 25"-d) to Reed Yellow (Rdg., XXX, 23"-b).
  Aerial mycelium: Mouse Gray.
  Soluble pigment: Pale Yellow.
(q) Gelatin (25° C.)
  Growth: Very poor.
  Aerial mycelium: None.
  Soluble pigment: None.
    Gelatine is liquefied slightly.
    The same is true with nutrient gelatin.
(r) Whole egg (37° C.)
  Growth: Colorless.
  Aerial mycelium: None.
  Soluble pigment: None.
(s) Litmus milk (37° C.)
  Growth: Surface growth, Cream color to Seashell Pink (Rdg., XIV, 11'-f).
  Aerial mycelium: None.
    The medium is weakly coagulated, then, peptonized to turn to Army Brown (Rdg., XL, 13"'-i) and becomes weakly acidic.
(t) Laffer's medium (37° C.)
  Growth: Naples Yellow (Rdg., XVI, 19'-d) at first and Light Buff later.
  Aerial mycelium: None.
  Soluble pigment: None.
    No liquefaction.
(u) Peptone glucose agar
  Growth: Chartreuse Yellow.
  Reverse: Honey Yellow.
  Aerial mycelium: Thin, Cream Buff.
  Soluble pigment: Yellow with a brownish tinge.
(v) Plain Agar
  Growth: Scarce and colorless growth into substance of medium.
  Reverse: Colorless to Mouse Gray.
  Aerial mycelium: Scarce, Tilleul Buff to Mouse Gray.
  Soluble pigment: None.

(3) Physiological properties (a) Temperature and pH range.
  No growth at 10° C. and at 50° C. on Bennett's agar or glucose asparagine agar under aerobic conditions. Growth occurs at 15°–45° C., and better growth at 37°–45° C. No growth when medium is pH 4. While growth occurs at pH 5–10, the optimum range is pH 6–7.
(b) Gelatin: Slightly liquefied.
(c) Starch: Hydrolyzed.
  Dia. of hydrolyzed area/dia. of colony=33 mm./8 mm.
(d) Tyrosinase reaction: Negative.
(e) Litmus milk: Peptonized. Coagulation, doubtful.
(f) Reduction of nitrate: Negative.
(g) Hydrolysis of cellulose: Negative.
(h) Chromogenicity: Negative.
(i) Product: antibiotic T-7545.

(4) Utilization of carbon sources

Table 1 shows the utilization of carbon sources by the present strain as examined by the method of Pridham et al. (Journal of Bacteriology 56 107–114 (1948)).

TABLE 1

Utilization of carbon sources by *streptomyces hygroscopicus* var. *limoneus*

| | | | |
|---|---|---|---|
| Erythritol | − | Inositol | ++ |
| Adonitol | − | D-mannitol | ++ |
| Sorbitol | + | Dulcitol | − |
| D-xylose | ++ | Trehalose | ++ |
| L-arabinose | ++ | Salicin | − |
| L-sorbose | − | Esculin | − |
| D-galactose | ++ | Inulin | ++ |
| Glucose | ++ | Dextran | + |
| D-fructose | ++ | Mannose | ++ |
| L-rhamnose | ++ | Starch | ++ |
| Melibiose | ++ | Glycerol | ++ |
| Maltose | ++ | Sodium acetate | + |
| Sucrose | ++ | Sodium succinate | + |
| Lactose | ++ | Sodium citrate | + |
| Raffinose | ++ | Calcium 2-keto gluconate | − |

NOTE.—++=Well utilized; +=Fairly utilized; −=Not utilized.

Thus, the present strain shows monopodial branching, the tip of its aerial mycelium being coiled. The conidia have a smooth surface. It gives bright yellow to buffcolored growth on synthetic media, generally; produces no brown soluble pigment on protein-containing media.

The foregoing cultural characteristics were compared with the descriptions given in "Bergey's Manual of Determinative Bacteriology," 7th ed. (The Williams and Wilkins, 1957), S. A. Waksman's. "The Actinomycetes," vol. 2 (The Williams and Wilkins, 1962) and Ralph Hütters Systematik der Streptomyceten" (Es. Karugas, 1967), for instance. It was found that the strain resembles *Streptomyces ambofaciens, Streptomyces platensis* and *Streptomyces hygroscopicus.*

However, despite of the close resemblance in the color of both vegetative and aerial mycelium, *Streptomyces ambofaciens* and the present strain differ from each other in that the former does not give black moist spots in the aerial mycelium, that it liquefies gelatin in a medium degree and gives yellow flocculent growth in the liquefied part and that it utilizes carbon sources different from those utilized by the present strain. *Streptomyces platensis* differentiates itself from the present strain in that the former produces a Deep Olive vegetative mycelium on Czapek's agar, with the reverse of the colony turning dark olive with the passage of time, that it gives cream to dull yellowish growth on starch agar with its aerial mycelium changing in color from white to Mouse Gray with black patches, and that it utilizes carbon sources different from those utilized by the present strain. Comparison of the descriptions of *Streptomyces hygroscopicus* with the cultural characteristics of the present strain shows that the present strain differentiates itself from *Streptomyces hygroscopicus* in that the growth or the reverse of the colony of the present strain shows the light yellow to buff on Czapek's agar (inclusive of glucose Czapek's agar and glycerol Czapek's agar), glucose asparagine agar, calcium malate agar and other media, and produces a yellowish white to yellow aerial mycelium on said Czapek's agar media. However, many of the cultural characteristics of this strain coincide with the stable characteristics of *Streptomyces hygroscopicus* indicated by Tresner and Backus (Applied Microbiology, vol. 4, p. 243, 1956). Accordingly we identified the present strain as a variant of *Streptomyces hygroscopicus* and designated it as *Streptomyces hydroscopicus* var. *limoneus*. This strain has been deposited with the Institute for Fermentation, Osaka, under the accession number of IFO–12703.

The strain has been deposited with American Type Culture Collection (ATCC) under the Accession number ATCC 21431.

As a general trait of Actinomycetes, their microbiological characteristics are highly mutative and *Streptomyces hygroscopicus* var. *limoneus* is no exception to the rule. For example, its cultural characteristics and pattern of utilization of carbon sources are susceptible to change, and there can be many mutants. Particularly, of this strain, mutants which have yellow aerial mycelia are easily obtained, e.g., a mutant designated as IFO–12704 has similar properties to the strain IFO–12703 except having yellow aerial mycelia which does not become hygroscopic. In addition to the deposit with Institute for Fermentation, Osaka, deposit of this mutant has also been made with ATCC under accession No. ATCC 21432. However, even those mutants may be employed in this invention in so far as they possess the capacity to produce the T–7545 antibiotic. It does not matter, of course, if the mutants are induced spontaneously or artificially. For purposes of this invention these mutants are the full equivalents of the above-denominated strains.

In the culture medium employed in this invention, assimilable carbon sources, digestible nitrogen sources, inorganic salts and the like are incorporated. If required, there may be added trace elements such as trace nutrients, growth factors, precursors, etc. to the culture medium. The carbon sources which the T–7545-producing strain assimilates include, among others, hydrocarbon, glucose, sucrose, molasses, starch, dextrin and glycerine. The nitrogen sources include such organic nitrogenous compounds such as meat extract, soybean flour, corn steep liquor peptone, casein, etc., as well as such inorganic nitrogen compounds as nitrates and ammonium compounds, and any of them can be employed to advantage.

While cultivation can be carried out by surface culture, it is more usual to adopt the aerobic submerged culture. In the case of the submerged culture, the pH of the medium is preferably near neutral, and while growth occurs at the incubation temperature of 20° to 40° C., it is preferable to maintain the medium within the range of about 23° to 37° C. The accumulation of the objective antibiotic is complete in 4 to 7 days.

The T–7545 does not inhibit the growth of bacteria and fungi in vitro test but only causes in *Pellicularia sasakii* and its closely related fungus an abnormal branching (excessive branching, or branched hyphae become an umbel like form) on the tips of the hyphae. Therefore, the bioassay of the present anitbiotic T–7545 is conducted in the following manner.

*Pellicularia sasakii* and plain agar are used as the test organism and the assay medium respectively. The test organism is cultivated on a potato (sucrose) agar plate for 2 to 5 days, and the resulting culture is used to inoculate at the center of a 9 cm. Petri dish plate of modified Pfeffer's medium, which is then incubated at 27° C. for 2 days. By the end of this period, the mycelium will have spread over the entire surface of the plate. The growth on the curcumference about 3 to 3.5 cm. in radius from the center is cut out with a cork borer and the agar disc thus obtained is used as the inoculum.

A serial dilution series of agar plates containing varying concentration of the antibiotic T–7545 is prepared in the same manner as a conventional agar dilution method.

A glass disc of 8 mm, in diameter and about 0.2 mm. thick, is placed in the center of each of the aforementioned dilution series of agar plates, and the agar disc inoculum is then placed on the glass disc. After incubated at 27° C. for 40 hours, the result is evaluated. Naked-eye examination reveals that *Pellicularia sasakii* the tip of hyphae of test organism growing from the agar disk inoculum undergoes abnormal branching. The dilution unit means the value of maximum dilution in which the solution is able to show such abnormal branching. The aqueous solution containing 1000 γ/ml. of purified T–7545–A or T–7545–B (purification described hereinafter) shows 100,000 dilution unit/ml. and 1500 dilution unit/ml., respectively.

Modified Pfeffer's medium, which is employed in this assay, has the following composition.

| | Percent |
|---|---|
| Sucrose | 3 |
| L-asparagine | 0.2 |
| Ammonium nitrate | 0.3 |
| Potassium dihydrogen phosphate | 0.1 |
| Magnesium sulfate | 0.1 |
| Velsenol [1] (Dow Chemical) | 0.001 |
| Agar | 1.2 |
| Adjusted to pH 7. | |

[1] A chelate compound, iron sodium ethanol ethylenediamine triacetate.

Before using the medium, the following vitamins are added in the specified amounts.

| | (Weight per ml. of medium), γ/ml. |
|---|---|
| Thiamine | 1 |
| Riboflavin | 1 |
| Calcium pantothenate | 1 |
| Niacin | 1 |
| Biotin | 0.005 |
| Folic acid | 0.5 |
| Pyridoxine hydrochloride | 2 |
| p-Aminobenzoic acid | 0.5 |
| Cyanocobalamine | 0.0002 |

When *Streptomyces hygroscopicus* var. *limoneus* is cultivated in the above manner, the antibiotic T-7545 is produced and accumulated mainly in the liquid phase of the broth. Therefore, to recover the antibiotic T-7545, it is preferable to filter the broth and, then, recover the antibiotic from the resulting filtrate. When the microorganism employed is capable of producing only one of the two antibiotics T-7545-A and T-7545-B, the produced antibiotic can, of course, be collected from the cultured broth in per se conventional manner. But, in case where the microorganism employed can produce simultaneously both of them, they are concomitantly accumulated in the broth, so that both antibiotics are collectible from the broth as a mixture of them or as an individual antibiotic T-7545-A or T-7545-B.

For the purpose of isolating the antibiotics, means which are conventionally used to recover the metabolites of microorganisms from their broths can be employed either singly or in combination. Thus, the means include such techniques as filtration, concentration, ion-exchange chromatography with ion exchangers, adsorption chromatography on active carbon, silica gel, alumina, etc., gel filtration with Sephadex (trade name of Pharmacia), Bio-Gel-P (BIO.RAD Laboratories), etc., the use of various solvents to bring the solute into another liquid phase, precipitation, removal of impurities, dialysis, drying and recrystallization, among others.

For the separation and purification of antibiotic T-7545 from impurities, for example, its water soluble and basic properties are used, e.g., while water soluble lower molecular impurities are passed through, the antibiotic T-7545 can be adsorbed on active carbon and eluted with an acid aqueous alcohol and/or aqueous acetone.

The antibiotic T-7545 can be adsorbed strongly on cation exchange resins when it is in a state of neutral or weakly acid solution, and eluted with bufferized basic solution, or an aqueous salt solution. The antibiotic T-7545 can be adsorbed weakly also on anion exchange resins and eluted with water.

The separation of antibiotics T-7545-A and T-7545-B is carried out by ion exchange chromatography using bufferized cation and anion exchange resins. For example, the antibiotic T-7545 can be adsorbed on Dowex-50W-X2 bufferized with the pyridine-acetic acid-buffer (pH 5-6), and T-7545-B is eluted with the bufferized solution (pH 6.2-6.8), while the T-7545-A is eluted with the bufferized solution (pH 7-7.5). When Dowex 1-X2 is used, the antibiotic T-7545-A is first eluted, and then T-7545-B is eluted with water. When silica gel is used as the adsorbent, the antibiotic T-7545-B is first eluated, then A follows with n-propanol-acetic acid-water (4:1:1).

Among the ion exchange resins (strong or weak) which can be employed for the aforesaid purpose, there may be mentioned, for example, Amberlite IR-100, 112 and 120, Amberlite XE-69, Amberlite IRC-50, Amberlite XE-89, Amberlite XE-64, Amberlite IR-45 and IRA-900 (all the above resins are the trade names of Rohm and Haas, Co.). Dowex-50-X2, Dowex-1-X2, Dowex-1-X8 (These three resins are trade names of Dow Chemical, Co.), Duolite CS-65 (trade name of Chemical Process, Co.), Permutit-50 (trade name is Permutit, Co.), etc. These resins may be prepared by such methods as described in "Ion Exchange Resin" (Robert Kumin, Published by John Wiley & Sons, Inc., New York, N.Y., U.S.A. pp. 87–97), or those described in literature references cited therein, and the proper mesh size and degree of cross-linking should be chosen for each resin-type according to the particular phase or stage of the process.

The afore-mentioned salts not only include the alkali salts of strong acids such as sodium chloride and ammonium chloride but also the alkali salts of organic acids such as sodium acetate, ammonium acetate, etc., as well as the salts of weak acids or weak bases such as those of acetic acid, pyridine and the like.

The desired substance which has been rather highly purified (purity 80% or higher) in the aforesaid manner is derived into its hydrochloride (1 mole), which can be further purified by the crystallization with a mixture of methanol and acetone as a white crystalline powder. Therefore, both the free form of the substance and its acid salt (e.g. hydrochloride, sulfate, organic sulfonate) may be used to advantage for their purification.

The antibiotics which can thus be obtained, have the following physical, chemical and physiological properties.

(1) Physical and chemical properties of the antibotic T-7545-A (a) Appearance, M.P. etc.
  A weakly basic white hygroscopic power, which has no definite melting point and decomposes at 100°–135° C.

(b) Solubility
  Readily soluble in water and polar organic solvents (e.g. methanol, pyridine, dimethylformamide, dimethylsulfoxide, etc.);
  Sparingly soluble in acetone and ethanol; and insoluble in ethyl acetate, ether and petroleum ether.

(c) Color reactions
  Molish reaction: positive
  Fehling reaction (under heating): positive
  Anthrone reaction: positive
  Phenol-sulfuric acid reaction: positive
  Orcinol-sulfuric acid reaction: positive
  Naphthoresorcin-sulfuric acid reaction: positive
  Benzidine-periodate reaction: positive
  Peptide-detection-reagent reaction: positive (tertiary-butylhypochloride)
  Alkaline potassium permanganate: reduce
  Ninhydrin reaction: faint purple color (d) pK'a and molecular weight
  pK'a _____ 6.2
  The molecular weight estimated by titration _____ 510±25

(e) Ultraviolet absorption spectrum
  No characteristic absorption is observed at above 210 mμ.

(f) Infrared absorption spectrum (FIG. 1)
  Significant absorption bands 3450(S), 2900(M), 1640(M), 1450(M), 1410(M), 1370(M), 1160(M), 1120–1000(S), 920(W), 900(M), 855(M). The abbreviations "M," "W" and "S" in parentheses denote medium adsorptions, weak adsorptions and strong adsorptions, respectively.

(g) The nuclear magnetic resonance spectrum of the sample suggests the presence of methine

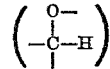

protons adjacent to the oxygen.

(h) Optical rotation
  $[\alpha]_D^{22}=$:
    110°±15° (C=1, $H_2O$)
    110±15° (C=1, pyridine)
    92.5±10° (C=1, dimethylformamide)

(i) Elementary analysis
  Constituent elements: C, H, N and O. After drying with phosphorous pentoxide at 60° C. for 6 hours under reduced pressure, the sample still shows the presence of water. C, 47.6±1.5%; H, 7.17±0.5%; N, 3.01±0.5%

(j) Paper chromatography
  Table 1 shows the Rf values measured by paper chromatography and thin-layer chromatography on Whatman No. 1 papers and those measured by Whatman No. 1 papers and those measured by thin-layer chromatography on silica gel. An alkaline potassium permanganate solution (an aqueous solution containing 2% sodium carbonate and 1% potassium permanganate) is used as a detecting reagent.

TABLE 1

| Solvent system | Paper chromatography T-7545-A | Paper chromatography T-7545-A hydrochloride | Thin-layer chromatography T-7545-A |
|---|---|---|---|
| n-Butanol: acetic acid: water (4:1:2) | 0.10-0.12 | 0.10-0.12 | 0.10 |
| 70% aqueous acetone | 0.44 | 0.37-0.44 | 0.53 |
| n-Butanol:ethanol:water:conc. aqueous ammonia (40:10:49:1) | 0.11-0.12 | 0.11-0.12 | 0.08 |
| Ethyl acetate:acetic acid:water (3:1:3) | 0.01 | 0.01 | 0.00 |
| Ethyl acetate:pyridine:water (2:1:2) | 0.01-0.02 | 0.01-0.02 | 0.01 |
| n-Butanol:pyridine:water (4:2:1) | 0.05 | 0.05 | 0.18 |
| n-Butanol:pyridine:water (4:3:7) | 0.46-0.48 | 0.46-0.48 | 0.27 |
| 80% phenol(NH₃) | 0.55 | 0.55 | 0.38 |
| n-Butanol:ethanol:water:pyridine (35:15:40:10) | 0.35-0.39 | 0.35-0.39 | 0.44 |
| n-Propanol:water:conc. aqueous ammonia (70:29:1) | 0.06-0.07 | 0.06 | 0.07 |
| n-Propanol:acetic acid:water (4:1:1) | | | 0.30 |

(k) Electrophoresis

Paper electrophoresis was carried out using 0.05 M boric acid buffer (pH 10) at a potential difference of 2 kv. for 2 hours, and using pyridine-acetic acid (pH 6.0) at a potential difference of 2 kv. for 3 hours. The mobility spectra of the present substance are as follows.

```
                                              Cm.
Boric acid buffer (pH 10) _____   +1.5
Pyridine-acetic acid buffer (pH 6.0) ____  −8.5
```

(l) Acid salt

The antibiotic T-7545-A has the weakly basic property, forms a salt with acid (e.g. hydrochloric acid, sulfuric acid, organic sulfonic acids, etc.).

(2) Physical and chemical properties of the antibiotic T-7545-B (a) Appearance, M.P., etc.

A weakly basic white hygroscopic powder, which has no definite melting point, and decomposes at 95°–140° C.

(b) Solubility

Readily soluble in water and polar organic solvents (e.g. methanol, pyridine, dimethylformamide, dimethylsulfoxide, etc.); sparingly soluble in acetone and ethanol; and insoluble in ethyl acetate, ether and petroleum ether.

(c) Color reactions

Molish reactions: positive
Fehling reaction (under heating): positive
Anthrone reaction: positive
Phenol-sulfuric acid reaction: positive
Orcinol-sulfuric acid reaction: positive
Naphthoresorcin-sulfuric acid reaction: positive
Benzidine-periodate reaction reaction: positive
Peptide - detection - reagent (tertiary - butylhypochloride reaction: positive
Alkaline potassium permanganate: reduce
Ninhydrin reaction: faint purple color.

(d) pK'a and Molecular weight pK'a _____ 5.0
The molecular weight estimated by titration _____ 520±25

(e) Ultraviolet absorption spectrum

No characteristic absorption is observed at above 210 mμ

Figure 2:
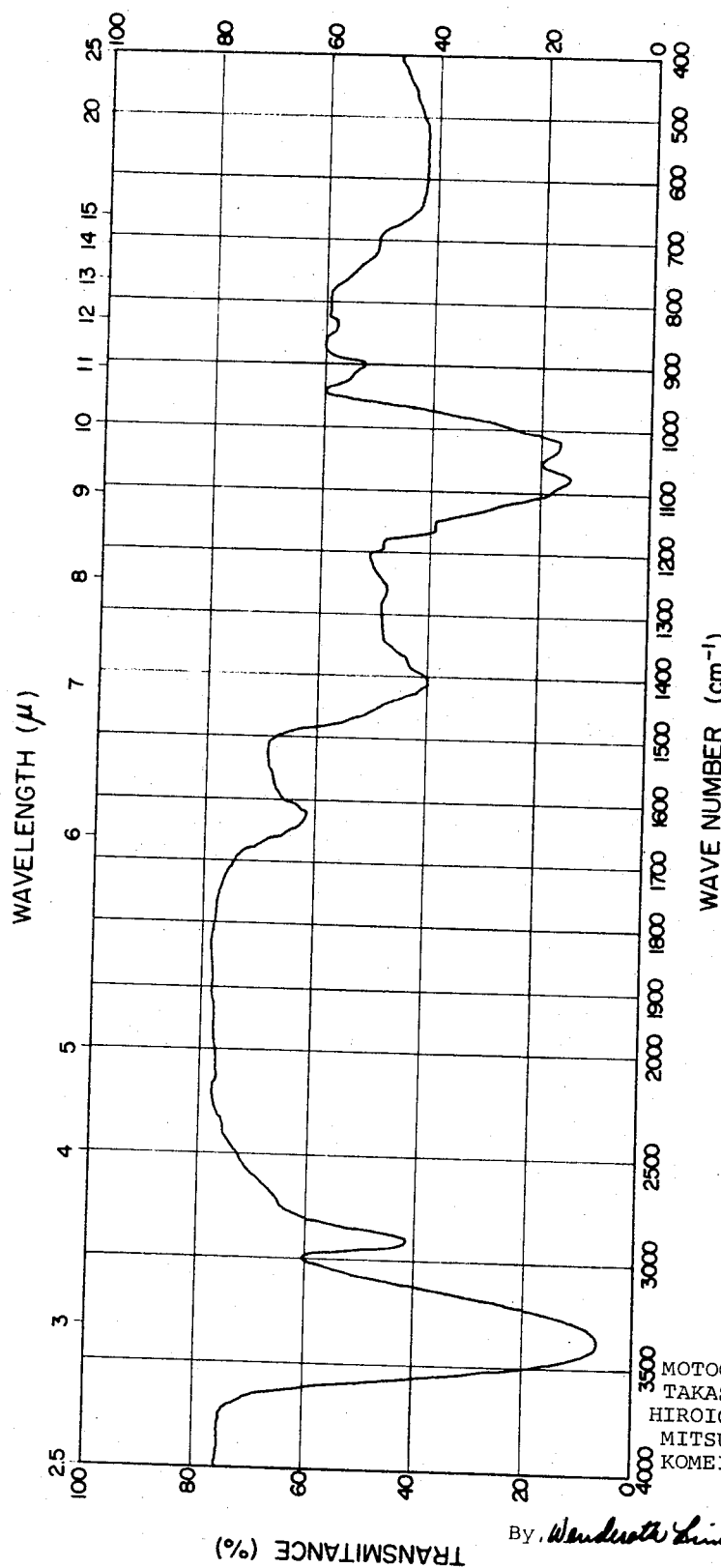

(f) Infrared absorption spectrum (FIG. 2).

Significant absorption bands 3400 (S), 2910 (M), 1638 (M), 1415 (M), 1080 (S), 1025 (S), 900 (M), 840 (M), The abbreviations "M", "W" and "S" in parentheses, denotes medium absorptions, weak adsorptions and strong adsorptions.

(g) The nuclear magnetic resonance spectrum of the sample suggests the presence of methine

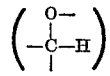

protons adjacent to the oxygen.

(h) Optical rotation $[\alpha]_D^{23} = 102 \pm 10°$ (C=1, H₂O)

(i) Elementary analysis

Constituent elements: C, H, N and O. After drying with phosphorus pentoxide at 60° C. for 6 hours under reduced pressure, the sample still shows the presence of water. C=46.46±1.5%;

H=7.06±0.5%
N=2.44±0.5%.

(j) Thin-layer chromatography

The Rf value measured by thin-layer chromatography on silica gel in which an alkaline potassium permanganate solution (an aqueous solution containing 2% sodium carbonate and 1% potassium permanganate) is used as a detecting reagent and n-propanol:acetic acid:water (4:1:1) is used as a developer, was 0.43.

(k) Electrophoresis

Paper electrophoresis was carried out using 0.05 M boric acid buffer (pH 10) at a potential difference of 2 kv. for 2 hours, and using pyridine-acetic acid (pH 6.0) at a potential difference of 2 kv. for 3 hours. The mobility spectra of the present substance are as follows.

```
                                              Cm.
Boric acid buffer (pH 10) _____   +6.0
Pyridine-acetic acid buffer (pH 6.0) ___   −4.0
```

(l) Acid salt

The antibiotic T-7545-B has the weak base-property, forms a salt with acid (e.g. hydrochloric acid, sulfuric acid, organic sulfonic acids, etc.).

(3) Biological properties of the antibiotic T-7545

The antimicrobial spectrum is shown in Table 2.

The assay medium used was a modified Pfeffer's medium (given above) for general filamentous fungi and yeasts, glucose bouillon agar for pathogenic filamentous fungi and plant pathogenic bacteria, bouillon agar for common bacteria, and glycerol bouillon agar for acid-fast bacteria. In each case, the agar dilution streak method was employed.

TABLE 2
Antimicrobal spectra of T-7545

| Assay organism | Conditions of assay | Minimal inhibitory concentraion, γ/ml. T-7545-A | Minimal inhibitory concentraion, γ/ml. T-7545-B |
|---|---|---|---|
| Pyricularia oryzae | 28° C., 40 hours | >100 | >100 |
| Pellicularia sasakii | do | >100 | >100 |
| Colletotrichum lagenarium | do | >100 | >100 |
| Alternaria kikuchiana | do | >100 | >100 |
| Aspergillus niger | do | >100 | >100 |
| Penicillium chrysogenum | do | >100 | >100 |
| Saccharomyces cerevisiae | do | >100 | >100 |
| Candida albicans | do | >100 | >100 |
| Trichophyton mentagrophytes | do | >100 | >100 |
| Xanthomonas oryzae | do | >100 | >100 |
| Bacillus subtilis | 37° C., 14 hours | >100 | >100 |
| Staphylococcus aureus | do | >100 | >100 |
| Sarcina lutea | do | >100 | >100 |
| Escherichia coli | do | >100 | >100 |
| Proteus vulgaris | do | >100 | >100 |
| Mycobacterium avium | do | >100 | >100 |
| Mycobacterium ATCC 607 | do | >100 | >100 |

Tables 3 and 4 show the activities of the present substances against several plant pathogenic fungi as measured by the method applying the same microbiological assay procedure as described before.

In the tables, each figure means the value of maximum dilution which gives rise to abnormal branching by an aqueous solution (1 mg./ml.) of the purified antibiotic T-7545-A or T-7545-B respectively.

Table 3.—Activities of T-7545-A against plant pathogenic fungi

| Assay organism: | The value of maximum dilution which gives rise to abnormal branching of the tip of hyphae |
|---|---|
| Pellicularia sasakii | 100,000 |
| Rhizoctonia solani | 50,000 |
| Corticium rolfsii | <100 |
| Phytophthora infestans | <2000 |

Table 4.—Activities of T-7545-B against plant pathogenic fungi

| Assay organism: | The value of maximum dilution which gives rise to abnormal branching of the tip of hyphae |
|---|---|
| Pellicularia sasakii | 1500 |
| Rhizoctonia solani | <20 |
| Corticium rolfsii | <100 |
| Phytophthora infestans | <2000 |

Thus, although T-7545 does not inhibit a number of microorganisms including even *Pellicularia sasakii* in ordinary test methods (in vitro), it showed remarkable controlling effect against the sheath blight of rice plant in vivo.

The ultra-violet region of the spectrum, infrared absorption spectrum, nuclear magnetic resonance spectrum, elementary analysis, and the other chemical properties of the antibiotic T-7545 suggest that it is an aminocyclitol antibiotic containing glucose in the molecule. However, the present antibiotic differs from the known aminocyclitol antibiotics or their related compounds in the starting microorganisms, the physical and chemical properties as well as the physiological properties. Hence the present antibiotic is considered to be a new antibiotic. T-7545–A and T-7545–B have almost similar infrared absorption spectra and ultra-violet absorption spectra, but $R_f$ value of thin-layer chromatography, mobility of high voltage paper electrophoresis and $pK'a$ are clearly different from each other and they are separable by the liquid chromatography.

Although these antibiotics show no substantial antimicrobial activity in vitro, they have strong protective effect on the living plants against *Pellicularia sasakii, Leptosphaeria salvinii, Rhizoctonia solani, Corticium rolfsii, Phyophthora infestans, Sclerotinia scherotiorum, Xanthomonas oryzae, Cladosporium fulvum,* so that these antibiotics of this invention are usable for agricultural fungicide or its components. They may be used in a form of powdery, liquid or granular composition with or without adjuvants or diluents. The concentration of these antibiotics in such compositions may generally be about 0.0001 to about 80% though the concentration may vary with the pests to be treated or with the condition or others.

EXAMPLE 1

To an aqueous mixture (pH 7) containing 3% glucose, 2.2% soybean flour and 0.3% peptone is added 0.4% precipitated calcium carbonate. 50 ml. aliquots of 4 liters of this mixture are measured into 200 ml. Erlenmeyer flasks, which are then sterilized. Each flask is inoculated with 1 ml. of a seed culture of *Streptomyces hygroscopicus* var. *limoneus* (IFO–12703, ATCC No. 21431) which has been prepared by shake culture on a medium having the same composition as above for 2 days, and incubated at 28° C. for 114 hours on a rotary shaker at 200 r.p.m. The resulting broths are combined and filtered. The procedure yields 2.8 liters of a filtered broth. (This broth containing 200 γ/ml. of T-7545-A and 150 γ/ml. of T₄7545–B). Alternatively the culture of *Streptomyces hydroscopicus* var. *limoneus* (IFO-12704, ATCC 21432) shows a similar result.

EXAMPLE 2

To an aqueous mixture (pH 7) containing 3% glucose, 2.2% soybean flour and 0.3% peptone is added 0.4% precipitated calcium carbonate. 500 ml. of aliquots of 2 liters of this mixture are measured into 4 Sakaguchi's flasks of 2 liters-capacity, which are then sterilized. In each flask is inoculated with a loopful of a slant culture of *Streptomyces hydroscopicus* var. *limoneus* (IFO–12703, ATCC No. 21431). The inoculated flasks are incubated at 28° C. for 2 days, on a reciprocating shaker having a swing amplitude of 10 cm. at 120 reciprocations/min. to prepare a seed culture. On the other hand, a stainless-steel tank of 200 liters-capacity is charged with 100 liters of a medium prepared by adding 0.6% precipitated calcium carbonate to an aqueous mixture (pH 7) containing 5% glucose, 3.6=soybean flour and 0.5% peptone. The mixture in the tank is sterilized and, then, inoculated with 2 liters of the above mentioned seed culture and incubated at 27° C. for 114 hours under the condition of 50% aeration and 200 r.p.m. The culture is filtered using as a filter aid 4 kg. of diatomaceous earth and 68 liters of a filtered broth containing a mixture of 100 γ/ml. of T-7545–A and 150 γ/ml. of T-7545–B is obtained. Substantially similar results are obtained when employing a culture of *Streptomyces hydroscopicus* var. *limoneus* (IFO–12704, ATCC No. 21432).

EXAMPLE 3–A

To 680 liters of a filtered broth (containing 100 γ/ml. of T-7545–A, and 50 γ/ml. of T-7545–B) obtained as in the manner of Example 2, is added 13.6 kg. of active carbon. The mixture is stirred for one hour so that the active ingredients contained in the filtered broth is adsorbed on the active carbon. So-treated active carbon is then collected by filtration, followed by washing twice with respective 136 liter portions of water. So-washed active carbon is twice subjected to elution of the active ingredients with 136 liter portions of a mixture of acetone-0.5 N hydrochloric acid (7:3), whereby 272 liters of the eluate is obtained, which is then passed through a column packed with 20 liters of Amberlite IR–45 (OH-form). The passed solution is concentrated under reduced pressure, followed by the addition of 10 times its volume of acetone to obtain 4.2 kg. of a crude substance which contains 10 γ/mg. of T-7545–A and 15 γ/mg. of T-7545–B (Yield: ca. 62%).

EXAMPLE 3–B

To 680 liters of a filtered broth (containing 100 γ/ml. of T-7545–A, and 150 γ/ml. of T-7545–B) obtained as in the manner of Example 2, is added 13.6 kg. of active carbon. The mixture is stirred for one hour so that the active ingredients contained in the filtered broth is adsorbed on the active carbon. So-treated active carbon is then collected by filtration, followed by washing twice with respective 136 liter portions of water. A column (70 liters) packed with so treated active carbon is subjected to elution with 250 liters of water saturated with butanol, so that the effective ingredient is eluted from the active carbon. The eluate is concentrated under reduced pressure, and there is added 10 times its volume of acetone to obtain 770 g. of a crude mixture, which contains 70 γ/mg. of T-7545–A and 100 γ/mg. of T-7545–B. (Yield: ca. 80%).

EXAMPLE 4

The filtered broth obtained as in the manner of Example 2 (680 liters containing 100 γ/ml. of T-7545–A and 150 γ/ml. of T-7545–B) is passed through a column packed with 55 liters of Amberlite IR–120 (H-form, S.V.=5), and then through another column packed with 65 liters of Amberlite IR–45 (OH form, S.V.=5). These columns are washed with 120 liters of water, then the washings are combined with the passed solution. The combined solution is passed (S.V.=2) through a column packed with 60 liters of Dowex 50W–X2 (H form, 50–100 mesh) to have the active ingredients adsorbed on the resin.

After washing with 350 liters of water, the active ingredients are eluted with 200 liters of 0.5 N NH₄OH. After the initial 30 liters of effluent is taken off. Then succeeding 125 liters of effluent is collected, and concentrated under reduced pressure, followed by the addition of 10 times its volume of acetone to obtain 420 g. of powdery crude active ingredients, which contains ca. 150 γ/mg. of T-7545-A and 200-250 γ/mg. of T-7545-B (Yield: 92%).

EXAMPLE 5

420 g. of the crude powder obtained by Example 4 is dissolved in 21 liters of pyridine-acetic acid buffer (0.1 M, pH 6.0). The solution is poured at SV2 onto the column (17.8 × 146 cm.) packed with 35 liters of Dowex 50 X2 (50-100 mesh) bufferized with the same buffer solution as above, whereby the active ingredients are adsorbed on the resin.

75 liters of the same buffer solution is further poured onto the column, so that impurities and pigments are eluted, followed by elution of T-7545-B with 125 liters of pyridine acetic acid buffer (0.1 M, pH 6.5) at SV2, then 75 liters of the eluate corresponding to 3-5 fractions (25 liters/fraction) showing positive reaction to Anthrone reagent is collected. So-collected eluate is concentrated under reduced pressure, followed by lyophilization, whereby 112 g. (750 γ/mg.) of crude T-7545-B is obtained in a powdery form. The yield is ca. 90%.

Onto the column from which T-7545-B is eluted out, 500 liters of pyridine, acetic acid buffer (0.1 M, pH 7.5) is poured at SV 2, then 250 liters of the eluate corresponding to 5-14 fractions (25 liters/fraction) showing positive reaction to Anthrone reagent is collected. So-collected eluate is concentrated under reduced pressure, followed by lyophilization, whereby 75 g. (750 γ/mg.) of crude T-7545-A is obtained in a powdery form. The yield is ca. 90%.

EXAMPLE 6

42 g. taken out of the mixture (containing 150 γ/mg. of T-7545-A and 200-250 γ/mg. of T-7545-B) obtained by Example 4, is dissolved in 210 ml. of water. The solution is passed through a column packed with 600 ml. of Amberlite IRA-900 (OH), (20-60 mesh), followed by the successive elution with water to collect 200 ml. each of effluent fractionally.

The fractions containing the active ingredients positive to anthrone reagent are detected, then the fractions are divided into T-7545-A-rich fractions (3rd to 7th fractions) and T-7545-B-rich fractions (8th to 16th fractions) by the aid of thin layer chromatography.

The former fractions (T-7545-A-rich fractions) are combined together, then a little amount of Amebrite IRC-50 (H) is added thereto, followed by the adjustment of pH to 8. The solution is concentrated under reduced pressure, then is added 10 times its volume of acetone to give 5.6 g. of crude substance containing 650-700 γ/mg. of T-7545-A and 250-300 γ/mg. of T-7545-B.

The same procedure is conducted on the latter fractions (T-7545-B-rich fractions) to give 9.5 g. of crude substance containing 200 γ/mg. of T-7545-A and 600-700 γ/mg. of T-7545-B. Yield ca. 85%.

EXAMPLE 7

To 150 g. of active carbon for chromatograph grade (Tokusei-Shirasagi sold by Takeda Chemical Industries, Ltd., Japan) is added 450 ml. of water, followed by dropwise addition of N HCl to make the pH of the supernatant 3. The mixture is packed in a column of 750 ml. (the ratios of its height to its diameter is 10), then the column is washed with water to make the pH of the washing 3.5. Through this column is passed at SV 3 a solution of 8.5 g. of crude T-7545-A (750 γ/mg.) in 750 ml. of N/500 HCl to have the active ingredient adsorbed.

The column is washed with 3 liters of N/500 HCl, followed by the elution of the active ingredient with mixture of methanol and N/500 HCl (3:7). The initial 0.5 liter of effluent is taken out, and is collected 2.0 liters of the next effluent which is colorless and positive to anthrone reaction. The active fraction thus obtained is passed at SV 5 through a column (200 ml., the ratio of its height to diameter is 6) packed with Amberlite IR 45 (OH) which is previously washed with 30% aqueous methanol to collect the passed solution. The column is washed with 500 ml. of 30% aqueous methanol to wash out the active ingredients remaining in the column.

The passed solution is combined with the washing, and concentrated under reduced pressure. To the concentrate is added 10 times its volume of acetone to obtain 5.4 g. of almost pure T-7545-A (950-1000 γ/mg.) as white powder (Yield: ca. 85%).

The same procedure as in the above on 8.5 g. of crude T-7545-B (750 γ/mg.) obtained as in the manner of Example 5 gives 5.7 g. of almost pure T-7545-B (950-1000 γ/mg.) as white powder (Yield: ca. 85%).

EXAMPLE 8

5.6 g. of T-7545-A-rich crude powder (700 γ/mg. T-7545-A, 300 γ/mg. T-7545-B) obtained by the manner described in Example 6 is dissolved in 30 ml. of water. The solution is poured onto the column (ratio of height to diameter is 30), packed with 500 ml. of resins (Dowex 1-X2, OH) to have the active ingredients adsorbed on the resins. The resins are subjected to elution with water. The effluent is collected by 500 ml. each fraction, while examining the presence of active ingredients in each fraction by the aid of anthrone reagent, whereby T-7545-A is detected in the 5th-7th fractions and T-7545-B in the 17th-25th fractions. The former fractions are concentrated under reduced pressure, followed by lyophilization, whereby 3.6 of T-7545-A (1000 γ/mg.) is obtained. The yield is about 90%. The latter fractions are concentrated under reduced pressure, followed by lyophilization, whereby 1.3 g. of T-7545-B (1000 γ/mg.) is obtained. The yield is about 80%.

9.5 g. of T-7545-B-rich crude powder (700 γ/mg. T-7545-B, 180 γ/mg. T-7545-A) obtained by the manner described in Example 6 is dissolved in 50 ml. of water. The solution is poured onto the column (ratio of height to diameter is 30) packed with 1 liter of resins (Dowex 1-X2, OH) to have the active ingredients adsorbed on the resins. The resins are subjected to elution with water. The effluent is collected by 500 ml. each fraction, while examining the presence of active ingredients in each fraction by the aid of anthrone reagent, whereby T-7545-A is detected in the 9th-11th fractions and T-7545-B in the 35th-60th fractions. The former fractions are concentrated under reduced pressure, followed by lyophilization, whereby 1.45 g. of T-7545-A (1000 γ/mg.) is obtained. The yield is about 85%. Same procedure on the latter fractions gives 5.5 g. of T-7545-B (1000 γ/mg.). The yield is about 83%.

EXAMPLE 9

One gram taken out of A-rich crude mixture of T-7545-A and T-7545-B obtained by the above Example 6 is dissolved in 50 ml. of methanol. The solution is admixed thoroughly with 1 gram of silca-gel, and the mixture is dried under reduced pressure. The dried mixture is placed on the top of the column (1.3 cm. × 90 cm.) packed with silica-gel, followed by the column chromatography eluting with n-propanol:acetic acid:water (4:1:1) by the aid of thin layer chromatography.

Then it is observed that T-7545-B is firstly eluted and then T-7545-A. The respective fractions containing each active ingredient are collected and each of the fractions is subjected to concentration under reduced pressure, followed by the precipitation with acetone to obtain 190 mg.

of T-7545-B as white powder (Yield: ca. 65%) and 420 mg. of T-7545-A as white powder (Yield: ca. 60%).

EXAMPLE 10

In 20 ml. of methanol is dissolved 1 g. of purified powder of T-7545-A obtained by the manner described in Examples 7, 8 or 9. 2 ml. of N HCl is added to the solution, then water and the methanol are distilled off to obtain 1 g. of T-7545-A-hydrochloride.

The same procedure as above on 1 g. of purified powder of T-7545-B obtained by the manner described in Example 7, 8 or 9 gives 1 g. of T-7545-B hydrochloride.

Heretofore, organic arsenic agent has been widely used for the control of the sheath blight of the rise plant, organic mercury compounds for the control of stem rot, and pentachloronitrobenzene agent (hereinafter referred to briefly as PCNB) for damping-off and sclerotial blight (southernblight). However, those materials are not always safe to men and domestic animals or even to fish and plants. For instance, organic arsenic agent are not only chronically toxic to men and beasts but also detract from the yield of rice crop, while organic mercury compounds are not free from chronic toxicity to men and animals, besides being poisonous to fish. PCNB is also injurious in that it adversely affects the growth of young seedlings which are to be protected. In the light of the foregoing, development of a new improved drug has been seriously awaited.

The culture broth of a T-7545 producing strain of microorganism of this invention exhibits a powerful inhibitory action against sheath blight in vivo test (application to young rice seedlings) despite the fact that it shows substantially no antimicrobial activity in ordinary microbiological assays (in vitro test). Further study has revealed that this antibiotic T-7545 has a peculiar characteristic that *only* when the plant or soil is treated therewith, does it show a strong disease-controlling effect.

Furthermore, the antibiotic T-7545 has been found to be very effective not only against the sheath blight of the rice plant but also against other plant diseases such as the stem rot of rice and the damping-off and sclerotial blight of vegetables, flowering plants and lumber seedlings. In addition, the antibiotic T-7545 is substantially harmless to men and beasts, as well as to fish, and even when applied in a high concentration, it does not substantially affect the germination, growth, yield and other features of useful plants.

The present economic poison composition may contain the culture broth of an antibiotic T-7545 producing strain belonging to the actinomycetes, filtrate, thereof, the concentrate thereof, or a purified preparation thereof. It is also possible to employ antibiotic T-7545 in the form of a free base or as the salts with suitable organic or inorganic acid (i.e. oxalic acid, succinic acid, sulfuric acid, hydrochloric acid, etc.) or with metals (e.g. sodium, cobalt, copper, aluminum, calcium, etc.). It is further permissible to employ an ester or ether of the antibiotic, for instance, which may be obtained by esterifying the hydroxyl of T-7545 with an acid (e.g. acetic acid, malonic acid or malic acid).

The compositions of this invention can be applied in any suitable manner. Thus, depending upon the purpose of application, application time, application method, etc., the composition may be directly applied as such, after dissolution or dispersion in a suitable liquid carrier, or after blending with a suitable solid carrier. If desired, by adding an emulsifying agent, dispersant, suspending agent, adsorbent, penetrant, wetting agent, thickener, stabilizer or/and adjuvant, the present composition may be used in such varied formulations as an oil solution, emulsion, wettable powder, aqueous solution, soluble powder, dust, tablet, granule and spray, etc.

It is further allowable to use such a composition after compounding or blending with such other germicides as copper germicides, organic sulfur germicides, organic chlorine germicides, organic phosphorus germicides, other antibiotics, etc., such insecticides as organic chlorine insecticides, organic phosphorus insecticides, carbamic acid insecticides, natural insecticides, etc., acaricides, nematocides, herbicides, plant growth regulators, synergistic agents, attractants, repellents, perfumes, plant nutrients, fertilizers and the like.

Toxicity of antibiotic substances T-7545-A and T-7545-B are as follows:

(a) The toxicity of the antibiotic T-7545-A, which is one of the effective ingredient of this composition, can be confirmed, for instance, by administering the antibiotic T-7545-A intravenously to mice and measuring the $LD_{50}$ value, or by measuring the median lethal dose for *Oryzias latipes*. The results of such measurements are shown in Table 1.

TABLE 1
Acute toxicity of T-7545-A

| Test animal | Test procedure | Toxicity |
|---|---|---|
| Mice | Intravenous injection | $LD_{50}$ >2,000 mg./kg. |
| Oryzias latipes | Leaving in water solution | $TL_m$ >40 p.p.m. |

(b) The toxicity of the antibiotic T-7545-B, which is another effective ingredient of this composition can be confirmed, for instance, by administering the antibiotic T-7545-B intravenously to mice and measuring the $LD_{50}$ value, or by measuring the median lethal dose for *Oryzias latipes*. The results of such measurements as shown in Table 2.

TABLE 2
Acute toxicity of T-7545-B

| Test animal | Test procedure | Toxicity |
|---|---|---|
| Mice | Intravenous injection | $LD_{50}$ >2,000 mg./kg. |
| Oryzias latipes | Leaving in water solution | $TL_m$ >40 p.p.m. |

The concentrations of the active ingredient in the present fungicides ready for use is usually from about 0.0001% to about 1.0% by weight, more preferably about 0.0003% to about 0.3% by weight, in case of the liquid form (i.e. a solution, a suspension or an emulsion); while in case of the solid composition, from about 0.01% to about 30% by weight, about 0.1% to about 20% by weight being preferable. But, if necessary, a composition containing a higher or lower concentration than the above-mentioned value may be put into use. The content of the active ingredient of composition may be from about 0.5% to about 80% by weight relative to the composition, when it is prepared for a concentrate form.

EXPERIMENT 1.—RICE SHEATH BLIGHT CONTROL TEST

Test procedure

Test plants: Rice.—Plants (variety: Kinmaze) were planted in earthen pots 9 cm. in diameter, 3 stocks per pot. Seedlings 80 days after potting were tested and 6 pots of them per group were used.

Inoculating method: Pathogenic fungi *Pellicularia sasakii* were cultivated on a plate of potato infusion-sugar-agar at 30° C. for 48 hours, and its agar disc 10 mm. in diameter was cut from a peripheral colony. The disc was inserted into the inside space of the leaf sheath near the soil surface, a disc per stem. The pots were kept in a PVC shelter at the atmospheric temperature of 32°–25° C. and the relative humidity of 100–70%. Inoculation was carried out immediately after the applied drug has been air-dried in the prophylactic test, and 3 days before application in the remedial test.

Application of the drug: A series of aqueous solutions prepared from a 10,000 dilution units/ml. cultural broth of *Streptomyces hygroscopicus* var. *limoneus* (IFO 12704, ATCC No. 21431) and diluted liquid preparations of commercial active control drugs were prepared. To each of those solutions and preparations, 0.05% (final concentration) of Dyne (a spreader manufactured by Takeda Chemical Industries, Ltd.) was added, and the mixture was sprayed evenly over the foliage by means of a spraygun at the rate of 30 ml. per 6 pots. The cultivation of the antibiotic-producing strain was carried out in the following manner. 60 ml. aliquots of a liquid medium were measured into 200 ml. Erlenmyer flasks, and each flask was inoculated with 1 loop of the above strain. The flasks were incubated at 28° C. for 5 days on a rotary shaker at 200 r.p.m.

The above medium had the following composition. 3% glucose, 2.2% raw soybean powder, 0.3% peptone and 0.4% calcium carbonate.

Assay method: 10 days after application of the drug, the length of each stem from ground level to the upper edge of the lesion was directly measured.

Result

TABLE 3

Sheath blight control effect of the cultural broth (The average length of lesions/stem (cm.))

| Drug | Dosage | Preventive effect | Remedial effect | Injury to plant |
|---|---|---|---|---|
| Untreated control | | 27.9 | 30.1 | — |
| Polyoxine PS emulsifiable concentrate [1] | X600 | 6.4 | 15.0 | — |
| Monzet wettable powder [2] | X2,000 | 0 | 1.1 | ++ |
| Cultural broth of *Streptomyces hygroscopicus* var. *limoneus* (IFO 12704, ATCC No. 21431) | ([3]) | 0 | 0.4 | — |
| | X2 | 0 | 0.4 | — |
| | X4 | 0 | 0.7 | — |
| | X8 | 0 | 1.2 | — |
| | X16 | 0 | 1.5 | — |
| | X32 | 0 | 3.7 | — |

[1] Containing 30,000 PS units/g. as polyoxine B (see note).
[2] Containing 20% of methylarsine-bis-dimethyldithiocarbamate, 20% of zinc-dimethyl-dithiocarbamate and 40% of bis-(dimethyl-thiocarbamoyl) disulfide.
[3] Undiluted.

NOTE.—PS represents *Pellicularia sasakii* and PS units/g. as polyoxine B means the units/g. of the effective fraction of polyoxin B against PS.

Evaluation

Up to a dilution multiple of 16, the cultural broth was highly effective, in terms of both prophylaxis and treatment, against the sheath blight of rice, and no injury at all to the plant was observed.

Experiment 2.—Rice sheath blight control test by pretreatment of the soil.

Test procedure

Test rice plants: Same as Experiment 1.
Inoculating method: Same as above.
Application of the drug: Aqueous solutions of a T-7545-A powder were sprayed as per the method of Experiment 1 or soil-injected at the rate of 5 ml. per pot.
Assay method: As per Experiment 1.

Result

| Drug | Dosage, p.p.m. | Preventive effect | Remedial effect | Injury to plant |
|---|---|---|---|---|
| Untreated control | | 25.2 | 28.7 | — |
| T-7545-A: | | | | |
| Spraying | 20 | 0.7 | 1.5 | — |
| | 40 | 0 | 0.6 | — |
| | 80 | 0 | 0.3 | — |
| Soil injection | 20 | 0.6 | 1.3 | — |
| | 40 | 0 | 0.5 | — |
| | 80 | 0 | 0.4 | — |

Evaluation

T-7545-A was as effective against the sheath blight of rice by soil-injection as by spraying.

No injury to the plant was observed, either, in preemergence treatment.

EXPERIMENT 3.—RICE SHEATH BLIGHT CONTROL TEST

Test procedure

Test plants: Rice plants (variety: Kinmaze) were planted in a/5,000 Wagner pots, 3 stocks/pot. 5 pots per group, in the ear-bearing stage were used for test.

Inoculating method: According to Experiment 1, an agar disc 20 mm. in diameter was fitted on the leaf sheath near the soil surface, 1 disc/2 stems, and the pots were placed in a vinyl house.

Application of the drug: 5 days after inoculation T-7545-A was applied at the dosage of 100 ml./5 pots as per Experiment 1.

Assay method: 21 and 35 days, respectively, after treatment, the procedure of Experiment 1 was followed.

Result

TABLE 5

Sheath blight control effect of T-7545-A (the average length of lesions/stem (cm.))

| Drugs | Dosage | Remedial effect After 21 days | Remedial effect After 35 days | Injury to plant |
|---|---|---|---|---|
| Untreated control | | 32.5 | 56.3 | — |
| Polyoxine PS concentrate fiable | X600 | 14.0 | 24.5 | — |
| Monzet wettable powder | X2,000 | 9.9 | 10.1 | ++ |
| T-7545-A | [1] 5 | 10.9 | 15.8 | — |
| | [1] 10 | 9.5 | 9.6 | — |
| | [1] 20 | 9.2 | 9.2 | — |
| | [1] 40 | 9.0 | 9.0 | — |

[1] Parts per million.

Evaluation

At the concentration of 10 p.p.m. or higher T-7545-A was highly effective in the treatment after the disease emergency, and suppressed the formation of new lesions for more than a month after exposure. No injury whatever, was observed even at the concentration of 40 p.p.m.

Experiment 4.—Rice stem rot control test

Test procedure

Test plants: As per Experiment 3.
Application of the drug: Same as above.
Inoculating method: Pathogenic fungi *Helminthosporium sigmoideum* were cultured on rice-straw medium at 28° C. for 14 days/piece (2 cm. length)/stem of the resulting culture was fitted into the inner space of the bottom leaf sheath of each rice plant stem, after the sprayed drug had been air-dried. Thereafter, the procedure as per Experiment 1 are employed and the pots were placed in a vinyl house.

Assay method: 14 days after inoculation, the length of the lesion in each stem was measured.

Result

TABLE 6

Stem rot control effect of T-7545-A (the average length of lesions/stem (cm.))

| Drug | Dosage | Preventive effect | Injury to plant |
|---|---|---|---|
| Untreated control | | 8.5 | — |
| Fumiron wettable powder [1] | X2,500 | 2.1 | — |
| | X1,250 | 0.6 | ± |
| T-7545-A | [2] 10 | 2.3 | — |
| | [2] 20 | 1.8 | — |
| | [2] 40 | 0.4 | — |

[1] Containing 5% of phenyl mercuric iodide.
[2] Parts per million.

Evaluation

At the concentration of 10 p.p.m. or higher, T-7545-A showed a strong effect upon stem rot.

Experiment 5.—Cucumber damping-off control test

Test procedure

*Rhizoctonia solani* was cultured on barley medium at 28° C. for 5 days. A field soil sample was packed into earthen pots 9 cm. in diameter, which were then sterilized with steam. The chaff inoculum was evenly worked into the cover soil of each pot to the depth of about 3 cm., at the rate of 2 g./pot. The pots were kept in an inoculation chamber at 28° C. for 24 hours and, then, transferred to a greenhouse.

Application of the drug: As per Experiment 1, the drug was sprayed onto the soil surface at the rate of 30 ml./6 pots/group.

Test plant: Healthy seeds of cucumber (variety: Sūyo) were sown by burial in the pots immediately after treatment, at the rate of 10 seeds/pot. The pots were then placed in a greenhouse at 32° C.–28° C.

Assay method: 14 days after sowing, the results were evaluated against the following coefficients of lesion and the degrees of damage were calculated.

Coefficients of lesion (I):
0: Healthy
0.5: Root hairs alone are slightly effected.
1: Aerial portions near soil surface and roots effected.
2: Early stage of damping-off.
3: Affected at germination; growth inhibited.

$$\text{Degree of damage (percent)} = \frac{\Sigma(nI)}{3 \times 6 \times 10} \times 100$$

wherein $n$ means the number of samples corresponding to each coefficient of lesion.

Result

TABLE 7
Damping-off control effect of T-7545-A

| Drug | Dosage | Degree of damage (percent) | Injury to plant |
|---|---|---|---|
| Untreated control | | 100 | — |
| Pentachloronitrobenzene | ×1,000 | 10 | + |
| 50% wettable powder (control) | ×500 | 0 | ++ |
| T-7545-A | [1] 5 | 7 | — |
| | [1] 10 | 1 | — |
| | [1] 20 | 0.3 | — |
| | [1] 40 | 0 | — |

[1] Parts per million.

Evaluation

At the concentration of 10 p.p.m. or higher, T-7545-A was highly effective against the damping-off caused by *Rhizoctonia solani* and had no injurious effect upon seed germination and the growth of seedlings.

Experiment 6.—Cucumber damping-off control test, by seed coating

Test procedure

Inoculating method: As per Experiment 5.
Application of the drug: Seeds were wetted with water and, then, lightly coated with a T-7545-A powder.
Average deposition rate: 80 mg./10 seeds.
Test plant: As per Experiment 5.
Assay method: Same as above.

Result

TABLE 8
Damping-off control effect of T-7545-A, by seed coating

| | T-7545-A dust | | Pentachloronitro-benzene dust | |
|---|---|---|---|---|
| Contents of effective ingredient | Degree of damage (percent) | Injury to plant | Degree of damage (percent) | Injury to plant |
| 0%, control [1] | 100 | — | | |
| 0.04% | 30 | — | 100 | — |
| 0.08% | 16 | — | 100 | — |
| 0.16% | 6 | — | 100 | — |
| 0.32% | 3 | — | 95 | — |
| 0.64% | 1 | — | 58 | — |
| 1.28% | 0.3 | — | 45 | — |
| 2.56% | 0 | — | 24 | ± |
| 5.12% | 0 | — | 12 | + |

[1] Powder-coating with adjuvant (talc) only.

Evaluation

T-7545-A is also effective against damping-off when applied as seed dust coating. In this method, no injurious effect was observed, either.

Experiment 7.—Cucumber Southern blight control test (Test procedure)

Inoculating method: As per Experiment 5, pathogenic fungi *Corticium rolfsii* were cultured for 10 days and the resulting culture was worked into the soil at the rate of 5 g. per pot. The pots were kept as previously explained.

Application of the drug: As per Experiment 5, the drug was applied at the rate of 30 ml./6 pots/group.

Test plants: Same as Experiment 5.
Assay method: Same as above.

Result

TABLE 9
Southern blight control effect of T-7545-A

| Drug | Dosage | Degree of damage (percent) | Injury to plant |
|---|---|---|---|
| Untreated control | | 87 | — |
| Pentachlornitrobenzene | ×4,000 | 38 | — |
| | ×2,000 | 17 | ± |
| 50% wettable powder | ×1,000 | 2 | + |
| T-7545-A | [1] 5 | 21 | — |
| | [1] 10 | 13 | — |
| | [1] 20 | 6 | — |
| | [1] 40 | 0 | — |

[1] Parts per million.

Evaluation

At the concentration of 10 p.p.m. or higher, T-7545-A was highly effective against Southern blight and not injurious to the plant.

Experiment 8.—Cucumber powdery mildew control test

Test procedure

Test plant: Healthy cucumber (variety: Suyo) planted in the a/5000 wagner pots. The 3 pots group of seedlings 60 days after potting were used.

Inoculating method: The above pots and the another pots planted cucumber which have already infected by *Sphaerotheca fuliginea* are stood one after the other so as to be taken ill by the natural infection respectively.

Application of the drug: A drug solution prepared in the same manner of Experiment 2 is applied at the rate of 100 ml. per 3 pots.

Assay method: Sample leaves which were healthy before the application of the drug but then have taken ill, are employed for this assay. The area of the lesion of 4 leaves per pot was measured.

Result

TABLE 10
Cucumber powdery mildew control effect of T-7545-A (the average specific area of lesions/leaf (percent))

| Drug | Dosage | 12 days after treatment | Injury to plant |
|---|---|---|---|
| Untreated sample | | 89.3 | — |
| Karathane [1] wettable powder | ×2,000 | 4.3 | + |
| T-7545-A | [2] 12.5 | 6.5 | — |
| | [2] 25 | 3.8 | — |
| | [2] 50 | 1.9 | — |

[1] Containing 19.5% of 2-(1-methylheptyl)-4,6-dinitrophenyl crotonate.
[2] Parts per million.

Evaluation

T-7545-A was effective as a control for powdery mildew, having no injurious effect upon cucumbers.

Experiment 9.—Tomato late blight control test

Test procedure

Test plants: Tomato plants (variety: ponterosa) are planted in 12-cm. in diameter pots, one plant per pot.

The seedlings 50 days after potting were used, 6 pots/group.

Application of the drug: Applied at the rate of 100 ml./6 pots/group as per Experiment 2.

Inoculating method: Pathogenic fungi (*Phytophthora infestans*) were cultured on a potato infusion-agar plate at 20° C. for 10 days and the resulting culture was used to prepare a zoospore water suspension (about $10^4$ zoospores/ml.). One day after the application of the drug, the plants were spray-inoculated with 20 ml. of the suspension per pot. The pots were kept in an inoculation chamber at 20° C. for 24 hours and, then, transferred to a greenhouse.

Assay method: 7 days after inoculation, the area of each lesion was measured.

Result

TABLE 11
Tomato late light control effect of T-7545-A

| Drug | Dosage | Percent ratio of average area of lesions per leaf to that of control | Injury to plant |
|---|---|---|---|
| Untreated control | -------- | (76) | — |
|  | -------- | 100 | — |
| Daconyl wettable powder [1] | [2] 250 | 21.7 | — |
|  | [2] 500 | 10.3 | — |
| T-7545-A | [2] 12.5 | 25.6 | — |
|  | [2] 25 | 18.2 | — |
|  | [2] 50 | 11.4 | — |

[1] Containing 75% of tetrachloroisophthalonitrile (Active control drug commonly used).
[2] Parts per million.

Evaluation

T-7545-A was effective against the late blight of the tomato plant, showing no injurious eyect on the plant.

Experiment 10.—Kidney bean stem rot control test

Test procedure

Test plants: One Kidney bean plant (variety: Taisho Kintoki) planted in each of 12 cm. diameter pots; the completely unfolded uppermost leaves cut off 40 days after potting were used, 6 leaves/group.

Application of the drug: To each solution of the drug, spreader Dyne was added until 0.05% (final conc.), and the above leaves were dipped and immediately allowed to air-dry.

Test vessel: 10 ml. water was put in Petri dishes 9 cm. in diameter, and a polyvinyl-chloride ring was placed in each of those humid vessels. The treated leaves were placed on top of the rings, a leaf per ring.

Inoculating method: Pathogenic fungi *Sclerotinia sclerotiorum* were cultured on a potato infusion sugar plate at 20° C. for 5 days, at the end of culture time some agar disc 10 mm. in diameter were cutout from a peripheral colony. Each one disc was placed on the center of each leaf and, then, kept in a thermostatic vessel at 20° C.

Assay method: 6 days after inoculation, the area of the lesion in each leaf was measured.

Result

TABLE 12
Kidney bean stem rot control effect of T-7545-A

| Drug | Concentration | Ratio of the average area of lesions per leaf (percent) | Injury to plant |
|---|---|---|---|
| Untreated control | -------- | 100 | — |
| T-7545-A | [1] 25 | 18 | — |
|  | [1] 100 | 14 | — |
| Earthcide ([2]) wettable powder | ×1,000 | 13 | — |

[1] Parts per million.
[2] Containing 50% of 2,6-dichloro-4-nitroaniline (control drug commonly used).

Evaluation

T-7545-A was effective against the stem rot of Kidney bean, and had no injurious effect upon the plant.

Experiment 11.—Pests control test with compound dusts

Test procedure

Sheath blight: As per Experiment 1, compound dusts were applied using a compact fine-duster at the rate of 300 mg. to 6 pots, 3 days after inoculation.

Bacterial leaf blight: Same as above, except that the seedlings 25 days after potting were treated.

Pathogenic bacteria *Xanthomonas oryzae* were cultured on a sucrose-bouillon medium at 28° C. for 1 day, and the uppermost leaf of each seedling was stabbed with a needle carrying a suspension ($10^8$/ml.) of the bacterial cells. The pots were kept in an inoculation chamber at 24° C. for 24 hours, and, then the pots were transferred to a greenhouse. 2 days after the inoculation, the pots were dusted in the same manner as above.

The length of each lesion was measured 10 days after inoculation.

Blast: Same as bacterial leaf blight.

Pathogenic fungi *Pyricularia oryzae* were cultured on a rice-straw infusion-agar medium at 28° C. for 10 days, and the pots were spray-inoculated with a suspension of the conidia ($10^6$/ml.) at the rate of 2 ml. per pot. The pots were kept in an inoculation chamber at 28° C. for 24 hours. The pots taken out from the box were dusted in the same manner as above and, then, transferred to a greenhouse. 7 days after the inoculation, the specific ratio of the average area of lesion was measured by Okamoto's method.

Rice stem borer: Rice plants in a./5,000 Wagner pots, 60 days after potting and on the fourth day of penetration by the larvae of *Chilo suppressalis* were dusted at the rate of 5 g. to 5 pots.

On the 8th day of penetration, the stems were dissected and the survival rate of the larvae was calculated.

Green rice leafhopper: Immediately after dusting in the same manner as described above for Rice stem borer, the rice plants were covered with netting, and adult leafhoppers (*Naphottetix cincticeps*) were set free in the netting.

After one day, the result was examined and the survival rate calculated.

Evaluation

The all mixed formulations showed no reduction in action against shealth blight and each used pests, and none of them had an injurious effect upon the rice plants.

Results

The control effects of various mixed formulations were as tabulated below.

TABLE 13

| T-7545-A concentration | Ingredient mixed | Concentration, percent | Sheath blight, percent lesion enlargement [1] | Bacterial leaf blight, percent length of lesion [1] |
|---|---|---|---|---|
| 0.2% | 2-amino-1,3,4-thiadiazol-5-thiol. | 5 | 12 | 3 |
| 0.2% | do | 5 | 12 | 3 |
| 0.3% | 2-formamido-1,3,4-thiazole; | 4 | 9 | 1 |
| 0.3% | do | 4 | 8 | 0 |
|  | 2-amino-1,3,4-thiadiazole. | 3 |  | 0 |
| 0.2% | do | 3 | 3 | 0 |
|  | 3-benzylidene-amino-4-phenyl-thiazoline-2-thion. | 5 |  | 8 |
| 0.3% | do | 5 | 2 | 8 |
| 0.1% | As Polyoxine B 1,000 PS, units/g. |  | 15 |  |
| .1% | As Polyoxine B 1,000 |  | 28 | 4 |

[1] Percentage (percent) with untreated control as 100.

TABLE 14

| T-7545-A concentration | Ingredient mixed | Percent concentration | Sheath blight, percent lesion enlargement[1] | Blast specific area of lesion[1] |
|---|---|---|---|---|
| 0.3% | Blasticidin-S-benzyl-aminobenzene-sulfonate. | 0.2 | 10 | 0.3 |
| 0.3% | do | 0.2 | 10 | 0.3 |
|  | Kasugamycin | 0.2 |  | 0.4 |
| 0.3% | do | 0.2 | 8 | 0.3 |
|  | O,O-diisopropyl-S-benzylthiophosphate. | 1.5 |  | 2.7 |
| 0.3% | do | 1.5 | 5 | 2.5 |
|  | O-ethyl-S,S-diphenyl-dithiophosphate. | 2 |  | 0.3 |
| 0.3% | do | 2 | 3 | 0.2 |

[1] Percentage (percent) with untreated control as 100.

TABLE 15

| T-7545-A concentration | Ingredient mixed | Concentration, percent | Sheath blight, percent lesion enlargement[1] | Percent survival rate of rice stem borer[1] |
|---|---|---|---|---|
| 0.2% | 1,3-bis(carbamoyl-thio)-2-(N,N-dimethylamino)-propane hydrochloride. | 2 | 12 | 1 |
| 0.2% | do | 2 | 8 | 0 |
|  | Dimethyl(3-methyl-4-nitrophenyl)thio-phosphate. | 2 |  | 3 |
| 0.2% | do | 2 | 9 | 3 |

[1] Percentage (percent) with untreated control as 100.

TABLE 16

| T-7545 concentration | Ingredient mixed | Concentration, percent | Sheath blight, percent lesion expansion | Percent survival rate of geen rice leafhopper |
|---|---|---|---|---|
| 0.3% | 1-naphthyl-N-methyl-carbamate. | 1.5 | 9 | 4 |
| 0.3% | do | 1.5 | 7 | 2 |

[1] Percentage (percent) with untreated control as 100.

Experiment 12.—Tomato leaf mold control test

Test procedure

Test plants: As per Experiment 9.
Application of the drug: Same as above.
Inoculating method: Pathogenic fungi *Cladosporium fulvum* were cultured on a potato infusion-sucrose plate at 20° C. for 14 days, and a suspension of conidia ($10^5$/ml.) was prepared from the culture.

The plants were spray-inoculated with the suspension 3 days before application of the drug, at the rate of 5 ml. per pot. The pots were kept in an inoculation chamber at 25° C. for 24 hours, and, then they were transferred to a greenhouse.

Assay method: 14 days after inoculation, the specific ratio of the average area of lesion in the leaves was measured.

Result

TABLE 17
Tomato leaf mold control effect of T-7545-A

| Drug | Dosage, p.p.m. | Specific area of lesion (percent) | Injury to plant |
|---|---|---|---|
| Untreated control |  | 98.9 | — |
| T-7545-A | 12.5 | 6.1 | — |
|  | 25.0 | 3.4 | — |
|  | 50.0 | 1.7 | — |

Evaluation

T-7545-A was effective aaginst the tomato leaf mold, and had no injurious effect upon the plants.

Experiment 13.—Rice sheath blight control test.

Test procedure

Test plants: As per Experiment 3.
Inoculating method: As per Experiment 3.
Application of the drug: As per Experiment 3, except that "T-7545-A" is exchanged for "T-7545-B."
Assay method: 14 days after treatment, the procedure of Experiment 1 was followed.

Result

TABLE 18
Sheath blight control effect of T-7545-B (the average length of lesions/stem (cm.))

| Drug | Dosage, p.p.m. | Remedial effect after 21 days | Injury to plant |
|---|---|---|---|
| Untreated control |  | 32.5 | — |
| T-7545-B | 10 | 14.5 | — |
|  | 20 | 12.6 | — |
|  | 40 | 12.6 | — |
|  | 80 | 12.6 | — |

Evaluation

At the concentration of 20 p.p.m. or higher, T-7545-B was highly effective in the treatment after the disease emergency, and suppressed the formation of new lesions for more than two weeks after exposure. No injury whatever, was observed even at the concentration of 80 p.p.m.

Experiment 14.—Rice sheath blight control test for the mixture of antibiotics T-7545-A and T-7545-B Test procedure Test plants: As per Experiment 1.
Inoculating method: As per Experiment 1.
Application of the drug: As per Experiment 3 except that "T-7545-A" is exchanged for "T-7545-A" and "T-7545-B," or "a mixture thereof."
Assay method: As per Experiment 1.

Results

TABLE 19
Sheath blight control effect of a mixture of T-7545-A and T-7545-B

| Dosage of drug (p.p.m.) | Percent of average length of diseased region (percent) |
|---|---|
| Untreated control | [1] 100 |
| T-7545-A (2.5 p.p.m.) | 23 |
| T-7545-A (5 p.p.m.) | 11 |
| T-7545-B (6.25 p.p.m.) | 65 |
| T-7545-B (12.5 p.p.m.) | 47 |
| T-7545-A (2.5 p.p.m.)+T-7545-B (6.25 p.p.m.) | 1 |
| T-7545-A (5 p.p.m.)+T-7545-B (12.5 p.p.m.) | 1 |

[1] 28.7 cm.

TABLE 20
Sheath blight control effect of a mixture of T-7545-A and T-7545-B

| Dosage of drug (p.p.m.) | Percent of average length of diseased region (percent) |
|---|---|
| Untreated control | [1] 100 |
| T-7545-A (5) | 25 |
| T-7545-A (10) | 21 |
| T-7545-A (20) | 2 |
| T-7545-B (10) | 76 |
| T-7545-B (20) | 7 |
| T-7545-B (40) | 4 |
| T-7545-A(8)+T-7545-B(2) | 5 |
| T-7545-A(5)+T-7545-B(5) | 5 |
| T-7545-A(2)+T-7545-B(8) | 42 |

[1] 30.1 cm.

Evaluation

T-7545-B was highly effective in the sheath blight control effect, particularly, a mixture of T-7545-B and T-7545-A have shown the high effectiveness of involution.

Experiment 15.—Cucumber damping-off control test

Test procedure

As per Experiment 5.

Result

TABLE 21

Damping-off control effect of T-7545-B

| Drug | Dosage | Degree of damage (percent) | Injury to plant |
|---|---|---|---|
| Untreated control | | 100 | — |
| Pentachloronitrobenzene | ×1,000 | 10 | + |
| 50% wettable powder (control) | ×500 | 0 | ++ |
| T-7545-B | 1 5 | 25 | |
| | 1 10 | 9 | — |
| | 1 20 | 3 | — |
| | 1 40 | 1 | — |

[1] Parts per million.

Evaluation

At the concentration of 20 p.p.m. or higher, T-7545-B was highly effective against the damping-off caused by Rhizoctonia and had no injurious effect upon seed germination and the growth of seedlings.

Experiment 16.—Cucumber damping-off control test, by seed coating

Test procedure

Inoculating method: As per Experiment 15.
Application of the drug: Same as above.
Test plant: As per Experiment 15.
Assay method. Same as above.

Result

TABLE 22

Damping-off control effect of T-7545-B, by seed coating

| | T-7545-B dust | | Pentachloronitrobenzene dust | |
|---|---|---|---|---|
| Contents of effective ingredient (percent) | Degree of damage (percent) | Injury to plant | Degree of damage (percent) | Injury to plant |
| 0, control [1] | 100 | — | | |
| 0.625 | 22 | — | 100 | — |
| 1.25 | 8 | — | 88 | — |
| 2.5 | 2 | — | 25 | — |
| 5 | 0 | — | 18 | ± |
| 10 | 0 | — | 10 | + |

[1] Powder-coating with adjuvant (talc) only.

Evaluation

T-7545-B is also effective against damping-off when applied as seed dust coating. In this method, no injurious effect was observed, either.

Experiment 17.—Cucumber damping-off control test for a mixture of T-7545-A and T-7545-B Test procedure

*Rhizoctonia solani* was cultured on barley medium at 28° C. for 5 days. In 10 kg. of the field soil sample which were sterilized with steam, is admixed 1.2 kg. of the cultivated chaff, and was worked into the cover soil to the total of about 5 cm. and then it stand for 24 hours under the 100% relative humidity at 28° C. And then, the mixture is dried at room temperature for 2 days and the cultivated chaff is passed through in the sieve and filtered off. The inoculated soil of *Rhizoctonia solani* obtained were kept into earthen pots 12 cm. in diameter at 450 g./pot.

Application of the drug: As per Experiment 5, the drug was sprayed onto the soil surface at the rate of 40 ml./2 pots/group.

Assay method: As per Experiment 5.

Results

TABLE 23

Cucumber damping-off control effect for a mixture of T-7545-A and T-7545-B

| Content of effective ingredient (p.p.m.) | Percent of damage (percent) |
|---|---|
| Untreated control | 100 |
| T-7545-A (10) | 69 |
| T-7545-A (20) | 24 |
| T-7545-A (40) | 11 |
| T-7545-B (10) | 88 |
| T-7545-B (20) | 32 |
| T-7545-B (40) | 16 |
| T-7545-A (5)+T-7545-B (5) | 56 |
| T-7545-A (10)+T-7545-B (10) | 16 |
| T-7545-A (20)+T-7545-B (20) | 3 |
| Pentachloronitrobenzene (500) | 16 |
| Pentachloronitrobenzene (1,000) | 3 |

TABLE 24

Cucumber damping-off control effect

| Content of effective ingredient | Concentration application method | Germinated seed | Percent of survival seedling from damping off after 14 days (percent) |
|---|---|---|---|
| Untreated control | | 0 | 0 |
| Uninoculation | | 90 | 90 |
| T-7545 | 5 p.p.m. use of soil | 20 | 16 |
| | 13 p.p.m. use of soil | 63 | 53 |
| | 26 p.p.m. use of soil | 88 | 82 |
| | 0.625% powder seed coat | 63 | 12 |
| | 1.25% powder seed coat | 75 | 37 |
| | 2.5% powder seed coat | 97 | 83 |
| | 5.0% powder seed coat | 95 | 95 |
| | 10% powder seed coat | 92 | 92 |

Evaluation

T-7545-B was highly effective in the cucumber damping-off control effect, particularly, a mixture of T-7545-B and T-7545-A have shown the high effectiveness of involution.

Experiment 18.—Rice sheath blight control test

Test procedure

Test plants: Rice. As per Experiment 3.
Inoculating method: As per Experiment 3.
Application of the drug: As per Experiment 3.
Assay method: As per Experiment 3, except to rain artifically from the unnatural-rain-tower at 25 mm. per 30 minutes, after one hour from application of the drug.

Result

TABLE 25

Rice sheath blight control effect of T-7545-A

| Content of effective ingredient | Concentration | Average length of diseased region (cm.) |
|---|---|---|
| Untreated control | | 46.2 |
| Polyoxcin PS emulsifiable concentrate (3%) | ×300 | 45.8 |
| Monzete wettable powder | ×2,000 | 11.4 |
| T-7545-A | 1 12.5 | 18.1 |
| | 1 25 | 11.4 |
| | 1 50 | 12.3 |
| | 1 100 | 10.2 |

[1] Parts per million.

Experiment 19.—Rice sheath blight control field test

Test procedure

Test place: Fukuchiyama, Japan.
Test plants: Rice plant (variety: Gohyakumankoku) which were planted in paddy in May 1, and seedling in July, 18, were used this test.

Inoculating method: Pathogenic fungi *Pellicularia sasaki* were cultured on rice-straw 2 cm. length medium at 28° C. for 5 days. These straws were inserted into the inside space of leaf sheath near the paddy field water in July 4.

Application of the drug: Each drug was sprayed evenly over the rice field by means of a spray-gun at the rate of 200 liters/10 a. (aqueous solution) and 3 kg./10 a. (dust) in July 11 and July 17, respectively.

Assay method: The results were evaluated against the following coefficients of lesion of each stem and the degree of damage were calculated.

Coefficients of lesion:
3: Formation of disease to flag leaf sheath
2: Formation of disease to secondary leaf sheath
1: Formation of disease to 3–4 leaf sheath Degree of damage $$= \frac{3 \times (\text{stem number indicated 3}) + 2 \times (\text{stem number indicated 2}) + 1 \times (\text{stem number indicated 1}) \times 100}{3 \times \text{all test stem}}$$

Result

TABLE 26

| Content of effective ingredient | Concentration | Average length of diseased region (cm.) | Percent of disease stem |
| --- | --- | --- | --- |
| Untreated control | | 88.2 | 100.0 |
| Polyoxcin PS emulsifiable concentrate (3%) | ×600 | 48.0 | 84.4 |
| Monkit solution [1] | ×600 | 48.0 | 84.4 |
| T-7545-A—solution | ×2,000 | 19.8 | 41.1 |
| T-7545-A—dust | [2] 28 | 19.2 | 45.2 |
|  | [3] 0.28 | 16.8 | 40.3 |

[1] Containing 6.5% of iron ammonium-methanearsonic acid.
[2] Parts per million.
[3] Percent.

EXAMPLE 1

Wettable powder: Percent
T-7545-A ------------------------------ 1.0
Sodium ligninsulfonate ---------------- 0.1
Polyoxyethylene alkylarylether -------- 0.1
White carbon -------------------------- 0.1
Clay ---------------------------------- 98.7

Depending upon the purpose and method of application, the above formulation is diluted to the range of 1–200 p.p.m. in terms of the present antibiotic and the diluted preparation is sprayed by means of a sprayer, applied to the soil surface, or above powder is used undilutedly to coat the seed.

EXAMPLE 2

Tablets: Percent
T-7545-A hydrochloride ---------------- 15.0
Polyoxyethylene alkylarylether -------- 2.0
Lactose ------------------------------- 83.0

Before application, the above formulation is diluted to the concentration range shown in Example 1.

EXAMPLE 3

Aqueous solution: Percent
T-7545-A ------------------------------ 40.0
Methanol ------------------------------ 5.0
Amine stearate ------------------------ 5.0
Water --------------------------------- 50.0

The above formulation is diluted to the range of 500–100,000 p.p.m. and the diluted preparation is sprayed by means of a fine concentrate sprayer from aircraft, for instance.

EXAMPLE 4

Emulsifiable concentrate: Percent
T-7545-A ------------------------------ 10.0
Polyoxyethylene alkylarylether -------- 5.0
Methanol ------------------------------ 20.0
Methylnaphthalene --------------------- 40.0
Dimethylformamide --------------------- 25.0

Before application, the above formulation is diluted to the concentration range given in Example 1.

EXAMPLE 5

Dust: Percent
T-7545-A ------------------------------ 0.1
Aluminum stearate --------------------- 0.02
Talc ---------------------------------- 99.88

Depending upon the objective and mode of application, the above mixture as such is dusted by means of a duster at the rate of 1–8 kg. to 10 a., or used to coat the seed.

EXAMPLE 6

Mixed dust A: Percent
T-7545-A ------------------------------ 0.2
2-amino-1,3,4-thiadiazole-5-thiol ----- 5.0
Aluminum stearate --------------------- 0.02
Talc ---------------------------------- 94.78

The above preparation is applied according to Example 5.

EXAMPLE 7

Mixed dust B: Percent
T-7545-A ------------------------------ 0.3
2-formamido-1,3,4-thiadiazole --------- 4.0
Talc ---------------------------------- 95.7

The above preparation is applied as per Example 5.

EXAMPLE 8

Mixed dust C: Percent
T-7545-A ------------------------------ 0.2
2-amino-1,3,4-thiadiazole ------------- 3.0
Talc ---------------------------------- 96.8

The above preparation is applied as per Example 5.

EXAMPLE 9

Mixed dust D: Percent
T-7545-A ------------------------------ 0.3
3 - benzylideneamino - 4 - phenylthiazoline - 2-thione ------------------------------ 5.0
Talc ---------------------------------- 94.7

The above preparation is applied as per Example 5.

EXAMPLE 10

Mixed dust E: Percent
T-7545-A ------------------------------ 0.3
Blasticidin S-benzylaminobenzenesulfonate --- 0.2
Talc ---------------------------------- 99.5

The above preparation is applied as per Example 5.

EXAMPLE 11

Mixed dust F: Percent
T-7545-A ------------------------------ 0.3
Kasugamycin --------------------------- 0.2
Talc ---------------------------------- 99.5

The above preparation is applied as per Example 5.

EXAMPLE 12

Mixed dust G: Percent
T-7545-A ------------------------------ 0.3
O,O-diisopropyl-S-benzylthiophosphate - 1.5
Talc ---------------------------------- 98.2

The above preparation is applied as per Example 5.

EXAMPLE 13

Mixed dust H: Percent
- T-7545-A — 0.3
- O-ethyl-S,S-diphenyl dithiophosphate — 2.0
- Talc — 97.7

The above preparation is applied as per Example 5.

EXAMPLE 14

Mixed dust I: Percent
- T-7545-A — 0.1
- Polyoxine (B;1,000 PS units/g.) — 0.1
- Talc — 99.8

The above preparation is applied as per Example 5.

EXAMPLE 15

Mixed dust J: Percent
- T-7545-A — 0.2
- 1,3 - bis(carbamoylthio) - 2(N,N - dimethylamino)propane hydrochloride — 2.0
- Talc — 97.8

The above preparation is applied as per Example 5.

EXAMPLE 16

Mixed dust K: Percent
- T-7545-A — 0.2
- Dimethyl(3 - methyl - 4-nitrophenyl)thiophosphate — 2.0
- Talc — 97.8

The above preparation is applied as per Example 5.

EXAMPLE 17

Mixed dust L: Percent
- T-7545-A — 0.3
- 1-naphthyl-N-methylcarbamate — 1.5
- Talc — 98.2

The above preparation is applied as per Example 5.

EXAMPLE 18

Wettable powder: Percent
- T-7545-B — 1.0
- Sodium ligninsulfonate — 0.1
- Polyoxyethylene alkylarylether — 0.1
- White carbon — 0.1
- Clay — 98.7

Depending upon the purpose and method of application, the above fomulation is diluted to the range of 2–400 p.p.m. in terms of the present antibiotic and the diluted preparation is sprayed by means of a sprayer, applied to the soil surface, or above powder is used undilutedly to coat the seed.

EXAMPLE 19

Tablets: Percent
- T-7545-B hydrochloride — 15.0
- Polyoxyethylene alkylarylether — 2.0
- Lactose — 83.0

Before application, the above formulation is diluted to the concentration range shown in Example 18.

EXAMPLE 20

Aqueous solution: Percent
- T-7545-B — 40.0
- Methanol — 5.0
- Amine stearate — 5.0
- Water — 50.0

The above formulation is diluted to the range of 1,000–200,000 p.p.m. and the diluted preparation is sprayed by means of a fine concentrate sprayer from aircraft, for instance.

EXAMPLE 21

Emulsifiable concentrate: Percent
- T-7545-B — 10.0
- Polyoxyethylene alkylarylether — 5.0
- Methanol — 20.0
- Methylnaphthalene — 40.0
- Dimethylformamide — 25.0

Before application, the above formulation is diluted to the concentration range given in Example 18.

EXAMPLE 22

Dust: Percent
- T-7545-B — 0.2
- Aluminum stearate — 0.02
- Talc — 99.78

Depending upon the objective and mode of application, the above mixture as such is dusted by means of a duster at the rate of 1–8 kg. to 10 a., or used to coat the seed.

EXAMPLE 23

Mixed dust M: Percent
- T-7545-B — 0.2
- 2-amino-1,3,4-thiadiazole — 3.0
- Talc — 96.8

The above preparation is applied as per Example 5.

EXAMPLE 24

Mixed dust N: Percent
- T-7545-B — 0.4
- Blasticidin-S-benzylaminobenzenesulfonate — 0.2
- Talc — 99.4

The above preparation is applied as per Example 5.

EXAMPLE 25

Mixed dust O: Percent
- T-7545-B — 0.4
- Kasugamycin — 0.2
- Talc — 99.4

The above preparation is applied as per Example 5.

EXAMPLE 26

Mixed dust P: Percent
- T-7545-B — 0.4
- O,O-diisopropyl-S-benzylthiophosphate — 1.5
- Talc — 98.1

The above preparation is applied as per Example 5.

EXAMPLE 27

Mixed dust Q: Percent
- T-7545-B — 0.4
- O-ethyl-S,S-diphenyl dithiophosphate — 2.0
- Talc — 97.6

The above preparation is applied as per Example 5.

EXAMPLE 28

Mixed dust R: Percent
- T-7545-B — 0.2
- Polyoxine (B; 1,000 PS units/g.) — 0.1
- Talc — 99.7

The above preparation is applied as per Example 5.

EXAMPLE 29

Mixed dust S: Percent
- T-7545-B — 0.4
- 1,3-bis(carbamoylthio) - 2 - (N,N - dimethylamino)propane hydrochloride — 2.0
- Talc — 97.6

The above preparation is applied as per Example 5.

EXAMPLE 30

Mixed dust T:                                      Percent
T-7545-B _____ 0.3
Dimethyl(3-methyl - 4 - nitrophenyl)thiophos-
 phate _____ 2.0
Talc _____ 97.7

The above preparation is applied as per Example 5.

EXAMPLE 31

Mixed dust U:                                      Percent
T-7545-B _____ 0.4
1-naphthyl-N-methylcarbamate _____ 1.5
Talc _____ 98.1

The above preparation is applied as per Example 5.

EXAMPLE 32

Mixed dust V:                                      Percent
T-7545-A _____ 0.2
T-7545-B _____ 0.1
Talc _____ 99.1

The above preparation is applied as per Example 5.

EXAMPLE 33

Mixed dust W: Freeze-dried powder of the culture broth of *Streptomyces hygroscopicus* var. *limoneous* (IFO 12703, ATCC No. 21431): 100%

The above preparation is applied as per Example 5.

What is claimed is:

1. A member selected from the group consisting of antibiotics T-7545-A and T-7545-B and a salt thereof with hydrochloric, sulfuric, oxalic or succinic acid, wherein T-7545-A has the following properties:

(a) A weakly basic white hygroscopic powder, which has no definite melting point, and decomposes at 100°–135° C.;
   (b) Readily soluble in water and polar organic solvents, sparingly soluble in acetone and ethanol, and insoluble in ethyl acetate, ether and petroleum ether;
   (c) Color reactions are as follows:
   Molish reaction: positive
   Fehling reaction (under heating): positive
   Anthrone reaction: positive
   Phenol-sulfuric acid reaction: positive
   Orcinol-sulfuric acid reaction: positive
   Naphthoresorcin-sulfuric acid reaction: positive
   Benzidine-periodate reaction: positive
   Peptide-detection-reagent reaction (tertiary butyl-hypochloride): positive
   Alkaline potassium permanganate: reduce
   Ninhydrin reaction: faint purple color
   (d) pK'a value is 6.2;
   (e) The molecular weight estimated by titration is 510±25;
   (f) No characteristic absorption is observed at above 210 m$\mu$;
   (g) Significant infrared absorption bands are: 3450(S), 2900(M), 1640(M), 1450(M), 1410(M), 1370(M), 1160(M), 1200–1000(S), 920(W), 900(M), 855(M),
   The abbreviations "M," "W" and "S" in parentheses denote medium absorptions, weak absorptions and strong absorptions, respectively;
   (h) Optical rotation: $[\alpha]_D^{22}=110°\pm15°$ (c.=1, H$_2$O); 110°±15° (c.=1, pyridine); 92.5°±10° (c.=1, dimethylformamide)
   (i) Elementary analysis: C, 47.6±1.5%; H, 7.17±0.5%; N, 3.01±0.5%
   (j) Rf values on paper partition chromatogram and on silica gel thin-layer chromatogram:

| Solvent system | Paper chromatography T-7545-A | Paper chromatography T-7545-A hydrochloride | Thin-layer chromatography T-7545-A |
|---|---|---|---|
| n-Butanol:acetic acid:water (4:1:2) | 0.10–0.12 | 0.10–0.12 | 0.10 |
| 70% aqueous acetone | 0.44 | 0.37–0.44 | 0.53 |
| n-Butanol:ethanol:water:conc. aqueous ammonia (40:10:49:1) | 0.11–0.12 | 0.11–0.12 | 0.08 |
| Ethyl acetate:acetic acid:water (3:1:3) | 0.01 | 0.01 | 0.00 |
| Ethyl acetate:pyridine:water (2:1:2) | 0.01–0.02 | 0.01–0.02 | 0.01 |
| n-Butanol:pyridine:water (4:2:1) | 0.05 | 0.05 | 0.18 |
| n-Butanol:pyridine:water (4:3:7) | 0.46–0.48 | 0.46–0.48 | 0.27 |
| 80% phenol (NH$_3$) | 0.55 | 0.55 | 0.38 |
| n-Butanol:ethanol:water:pyridine (35:15:40:10) | 0.35–0.39 | 0.35–0.39 | 0.44 |
| n-Propanol:water:conc. aqueous ammonia (70:29:1) | 0.06–0.07 | 0.06 | 0.07 |
| n-Propanol:acetic acid:water (4:1:1) | | | 0.30 |

(k) Paper electrophoresis using boric acid buffer (pH 10) at a potential difference of 2 kv. for 2 hours: +1.5 cm.;
   Paper electrophoresis using pyridine-acetic acid (pH 6.0) at a potential difference of 2 kv. for 3 hours: −8.5 cm.;

and T-7545-B has the following properties:

(a) A weakly basic white hygroscopic powder, which has no definite melting point, and decomposes at 95° to 140° C.
   (b) Readily soluble in water, polar organic solvents; sparingly soluble in acetone, and ethanol; and insoluble in ethyl acetate, ether and petroleum ether;
   (c) Color reactions are as follows:
   Molish reaction: positive
   Fehling reaction (under heating): positive
   Anthrone reaction: positive
   Phenol-sulfuric acid reaction: positive
   Orcinol-sulfuric acid reaction: positive
   Naphthoresorcin-sulfuric acid reaction: positive
   Benzidine-periodate reaction: positive
   Peptide-detection-reagent reaction (tertiary butylhypochloride): positive
   Alkaline potassium permanganate: reduce
   Ninhydrin reaction: faint purple color
   (d) pK'a value is 5.0
   (e) The molecular weight estimated by titration is 520±25;
   (f) No characteristic absorption is observed at above 210 m$\mu$;
   (g) Significant infrared absorption bands are: 3400(S), 2910(M), 1638(M), 1415(M), 1080(S), 1025(S), 900(M), 840(M);
   The abbreviations "M," "W" and "S" in parentheses denote medium absorptions, weak absorptions and strong absorptions, respectively;
   (h) Optical rotation $[\alpha]_D^{23}=102°\pm10°$ (c.=1, H$_2$O)
   (i) Elementary analysis: C, 46.46±1.5%; H, 7.06±0.5%; N, 2.44±0.5%
   (j) Rf values on spot films for silica gel thin-layer chromatographic use: 0.43 (n-propanol:acetic acid:water: 4:1:1)
   (k) Electrophoresis
   paper electrophoresis using boric acid buffer (pH 10) at a potential difference of 2 kv. for 2 hours: +6.0 cm.;
   paper electrophoresis using pyridine-acetic acid (pH 6.0) at a potential difference of 2 kv. for 3 hours: −4.0 cm.

2. A compound as in claim 1, wherein the acid salt is hydrochloride or sulfate.

3. A process for producing an antibiotic T-7545, which comprises cultivating, by a surface culture method or submerged culture method, *Streptomyces hygroscopicus* var. *limoneus* ATCC No. 21431 or ATCC No. 21432 in a culture medium containing an assimilable carbon source, a digestible nitrogen source and an inorganic salt at a temperature of 15 to 45° C. and a pH of 5 to 10, until the antibiotic has accumulated in the culture medium.

4. A process for producing an antibiotic T-7545, which comprises cultivating, by a surface culture method or submerged culture method, *Streptomyces hygroscopicus* var. *limoneus* ATCC No. 21431 or ATCC No. 21432 in a culture medium containing an assimilable carbon source, a digestible nitrogen source and an inorganic salt at a temperature of 15 to 45° C. and a pH of 5 to 10, until the antibiotic has accumulated in the culture medium, and recovering the antibiotic from the resulting broth.

References Cited

Miller, The Pfizer Handbook of Microbial Metabolites, McGraw-Hill Book Co., Inc., New York, N.Y., 1961, p. 580.

JEROME V. GOLDBERG, Primary Examiner

U.S. Cl. X.R.

195—80